US011115430B2

(12) United States Patent
Woolley et al.

(10) Patent No.: US 11,115,430 B2
(45) Date of Patent: Sep. 7, 2021

(54) TACTICAL BUS FUZZ TESTER

(71) Applicant: RAYTHEON COMPANY, Waltham, MA (US)

(72) Inventors: Brandon Woolley, Murphy, TX (US); Ross MacKinnon, Plano, TX (US); Eric Rammelsberg, Plano, TX (US)

(73) Assignee: RAYTHEON COMPANY, Waltham, MA (US)

( * ) Notice: Subject to any disclaimer, the term of this patent is extended or adjusted under 35 U.S.C. 154(b) by 407 days.

(21) Appl. No.: 15/619,164

(22) Filed: Jun. 9, 2017

(65) Prior Publication Data

US 2018/0359273 A1    Dec. 13, 2018

(51) Int. Cl.
*H04L 29/06* (2006.01)
*H04L 12/26* (2006.01)
*H04L 12/40* (2006.01)
*H04L 12/413* (2006.01)

(52) U.S. Cl.
CPC .......... *H04L 63/1433* (2013.01); *H04L 12/40* (2013.01); *H04L 12/413* (2013.01); *H04L 43/50* (2013.01)

(58) Field of Classification Search
CPC ..... H04L 63/1433; H04L 12/40; H04L 43/50; H04L 12/413
See application file for complete search history.

(56) References Cited

U.S. PATENT DOCUMENTS

| 7,594,142 | B1* | 9/2009 | O'Leary ............... G06F 21/577 714/38.11 |
| 7,926,114 | B2 | 4/2011 | Neystadt et al. |
| 7,953,674 | B2 | 5/2011 | Wu et al. |
| 8,010,844 | B2 | 8/2011 | Lee et al. |
| 8,336,102 | B2 | 12/2012 | Neystadt et al. |
| 8,417,993 | B2 | 4/2013 | O'Leary |
| 10,248,522 | B1* | 4/2019 | Cain ..................... G06F 11/263 |
| 2016/0259943 | A1* | 9/2016 | Murthy ................. G06F 21/577 |
| 2016/0337218 | A1* | 11/2016 | Shon ...................... H04L 69/08 |
| 2019/0141074 | A1* | 5/2019 | Oka ........................ H04L 67/12 |

OTHER PUBLICATIONS

Parnian Najafi Borazjani, Christopher E. Everett and Damon McCoy, "OCTANE: An Extensible Open Source Car Security Test Best", George Mason University, 2014, pp. 1-10. (Year: 2014).*

* cited by examiner

*Primary Examiner* — Joseph P Hirl
*Assistant Examiner* — Chi D Nguy
(74) *Attorney, Agent, or Firm* — Cantor Colburn LLP

(57) ABSTRACT

A method, apparatus and computer-readable medium for testing a target device. A fuzzer and a monitor are connected to the target device via a tactical bus. The fuzzer records messages sent from a source device to the target device over the tactical bus, creates a first fuzzed message having a data structure of the recorded message, and sends the first fuzzed message to the target device over the tactical bus. A fuzzer monitor monitors the target device for an anomalous response to the first fuzzed message, and determines a vulnerability of the target device from the response to the first fuzzed message.

20 Claims, 27 Drawing Sheets

Receive

MESSAGE #1
(2016)(229)14:08:30.642.187.400    IM Gap: 53.1us
BUS A - CMD:0904 (1-R-8-4) BCRT
C000 1608 1614 0830     506
Rsp Time 6.4us STS:0800
Message Time = 124.4us

Transmit

MESSAGE #1
(1)00:00:00.000.000.000    IM Gap: 53.1us
BUS A - CMD:0904 (1-R-8-4) BCRT
C000 1608 1614 0830     508
Rsp Time 6.4us STS:0800
Message Time = 124.4us

MESSAGE #2
(1)00:00:00.000.177.500    IM Gap: 53.1us
BUS A - CMD:0904 (1-R-8-4) BCRT
C000 1608 1614 083F     510
Rsp Time 6.4us STS:0800
Message Time = 124.4us

MESSAGE #3
(1)00:00:00.000.355.000    IM Gap: 53.1us
BUS A - CMD:0904 (1-R-8-4) BCRT
C000 1608 1614 08FF     512
Rsp Time 6.4us STS:0800
Message Time = 124.4us

MESSAGE #4
(1)00:00:00.000.532.500    IM Gap: 53.1us
BUS A - CMD:0904 (1-R-8-4) BCRT
C000 1608 1614 0FFF     514
Rsp Time 6.4us STS:0800
Message Time = 124.4us

. . . . . . .

MESSAGE #17
(1)00:00:00.002.840.000    IM Gap: 53.1us
BUS A - CMD:0904 (1-R-8-4) BCRT
FFFF FFFF FFFF FFFF     520
Rsp Time 6.4us STS:0800
Message Time = 124.4us

FIG. 5

FIG. 8

1100

Receive

1102

MESSAGE #1
[2016](229)14:08:30.642.187.400    IM Gap: 53.1us
BUS A - CMD:0904 (1-T-18-4) BCRI  1106
C000 1608 1614 0830
Rsp Time 6.4us  STS:0800
Message Time = 124.4us

Transmit

1104

MESSAGE #1
[2016](229)14:08:30.642.187.400    IM Gap: 53.1us
BUS A - CMD:0904 (1-T-18-4) BCRI  1106
C000 1608 1614 0830  STS:0800
Rsp Time 6.4us  STS:0800
Message Time = 124.4us
MESSAGE #2
(1)00:00:00.000.000.000    IM Gap: 6us
BUS A - CMD:0800 (1-R-0-0) MODE CODE
          1553B Reserved Mode Code Rsp Time 8.5us  STS:0800
Message Time = 46.5us
MESSAGE #3
(1)00:00:00.000.052.500    IM Gap: 6us
BUS A - CMD:0801 (1-R-0-1) MODE CODE
          1553B Reserved Mode Code Rsp Time 8.5us  STS:0800
Message Time = 46.5us
MESSAGE #4
(1)00:00:00.000.105.000    IM Gap: 6us
BUS A - CMD:0802 (1-R-0-2) MODE CODE
          1553B Reserved Mode Code Rsp Time 8.5us  STS:0800
Message Time = 46.5us

. . . . . . . .

MESSAGE #33
(1)00:00:00.002.000.000    IM Gap: 53.1us
BUS A - CMD:0904 (1-R-8-4) BCRI
C000 1608 1614 0830
Rsp Time 6.4us  STS:0800
Message Time = 124.4us

FIG. 11

ARINC 429 data words are 32 bit words made up of five primary fields:

- Parity – 1 bit
- Sign/Status Matrix (SSM) – 2 bits
- Data – 19 bits
- Source/Destination Identifier (SDI) – 2 bits
- Label – 8 bits

| MSB | | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|
| 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| P | SSM | | MSB | | | | | | | | | | | | | | | | | LSB | SDI | | | Label | | | | | | | |

ARINC 429 32 bit Word Format

FIG. 13

Unfuzzed

| | |
|---|---|
| RX Channel 1, Seq Num 106 [2013](153)12:35-11.568.222.160 Label 036 | 65CD5678 |
| RX Channel 1, Seq Num 107 [2013](153)12:35-11.568.322.160 Label 242 | 1355FF45 |
| RX Channel 2, Seq Num 53 [2013](153)12:35-11.568.422.160 Label 054 | 0FCBF534 |
| RX Channel 3, Seq Num 53 [2013](153)12:35-11.568.522.160 Label 304 | 7D584923 |
| RX Channel 4, Seq Num 159 [2013](153)12:35-11.568.622.160 Label 110 | 2ED04D12 |
| RX Channel 4, Seq Num 160 [2013](153)12:35-11.568.722.160 Label 314 | 51DB0D33 |
| RX Channel 4, Seq Num 161 [2013](153)12:35-11.568.822.160 Label 042 | 33279844 |
| RX Channel 1, Seq Num 108 [2013](153)12:35-11.678.166.520 Label 036 | 16A35B78 |
| RX Channel 1, Seq Num 109 [2013](153)12:35-11.678.266.520 Label 242 | 38CD6945 |

1400 →
1402 →

Fuzzed

| | |
|---|---|
| RX Channel 1, Seq Num 106 [2013](153)12:35-11.568.222.160 Label 036 | 600ED78 |
| RX Channel 1, Seq Num 107 [2013](153)12:35-11.568.322.160 Label 242 | 80468745 |
| RX Channel 2, Seq Num 53 [2013](153)12:35-11.568.422.160 Label 054 | 60FCB134 |
| RX Channel 3, Seq Num 53 [2013](153)12:35-11.568.522.160 Label 304 | 01392523 |
| RX Channel 4, Seq Num 159 [2013](153)12:35-11.568.622.160 Label 110 | A12F7512 |
| RX Channel 4, Seq Num 160 [2013](153)12:35-11.568.722.160 Label 314 | 4189B133 |
| RX Channel 4, Seq Num 161 [2013](153)12:35-11.568.822.160 Label 042 | A06D2844 |
| RX Channel 1, Seq Num 108 [2013](153)12:35-11.678.166.520 Label 036 | E12AB78 |
| RX Channel 1, Seq Num 109 [2013](153)12:35-11.678.266.520 Label 242 | A1F8F545 |

Unfuzzed 1900

→ 1902

```
RX Channel 1, Seq Num 106
[2013](153)(12:35:11.568.222.160   Label 036   65CD5678

RX Channel 1, Seq Num 107
[2013](153)(12:35:11.568.322.160   Label 242   1355FF45

RX Channel 2, Seq Num 53
[2013](153)(12:35:11.568.422.160   Label 054   0FCBF534

RX Channel 3, Seq Num 53
[2013](153)(12:35:11.568.522.160   Label 304   7D584923

RX Channel 4, Seq Num 159
[2013](153)(12:35:11.568.622.160   Label 110   2ED04D12

RX Channel 4, Seq Num 160
[2013](153)(12:35:11.568.722.160   Label 314   51DB0D33

RX Channel 4, Seq Num 161
[2013](153)(12:35:11.568.822.160   Label 042   33279844

RX Channel 1, Seq Num 108
[2013](153)(12:35:11.678.166.520   Label 036   16AE5B78

RX Channel 1, Seq Num 109
[2013](153)(12:35:11.678.266.520   Label 242   38CD6945
```

Fuzzed

→ 1904

```
RX Channel 1, Seq Num 106
[2013](153)(12:35:11.568.222.160   Label 036   65CD5678

RX Channel 1, Seq Num 107
[2013](153)(12:35:11.568.322.160   Label 242   9355FF45

RX Channel 2, Seq Num 53
[2013](153)(12:35:11.568.422.160   Label 054   8FCBF534

RX Channel 3, Seq Num 53
[2013](153)(12:35:11.568.522.160   Label 304   FD586923

RX Channel 4, Seq Num 159
[2013](153)(12:35:11.568.622.160   Label 110   2ED04D12

RX Channel 4, Seq Num 160
[2013](153)(12:35:11.568.722.160   Label 314   51DB8D33

RX Channel 4, Seq Num 161
[2013](153)(12:35:11.568.822.160   Label 042   33279844

RX Channel 1, Seq Num 108
[2013](153)(12:35:11.678.166.520   Label 036   16AE5B78

RX Channel 1, Seq Num 109
[2013](153)(12:35:11.678.266.520   Label 242   38CD6945
```

FIG. 19

Unfuzzed

2100 →

```
RX Channel 1, Seq Num 106
[2013](153)(12:35:11.568.222.160    Label 036    65CD5678

RX Channel 1, Seq Num 107
[2013](153)(12:35:11.568.322.160    Label 242    1355FF45

RX Channel 2, Seq Num 53
[2013](153)(12:35:11.568.422.160    Label 054    0FCBF534

RX Channel 3, Seq Num 53
[2013](153)(12:35:11.568.522.160    Label 304    7D584923

RX Channel 4, Seq Num 159
[2013](153)(12:35:11.568.622.160    Label 110    2ED04D12

RX Channel 4, Seq Num 160
[2013](153)(12:35:11.568.722.160    Label 314    51DB0D33

RX Channel 4, Seq Num 161
[2013](153)(12:35:11.568.822.160    Label 042    33279844

RX Channel 1, Seq Num 108
[2013](153)(12:35:11.678.166.520    Label 036    16A35B78

RX Channel 1, Seq Num 109
[2013](153)(12:35:11.678.266.520    Label 242    38CD6945
```

2102 →

Fuzzed

2104 →

```
RX Channel 1, Seq Num 106
(1)00:00:00.000.000.000    Label 036    65CD5678

RX Channel 1, Seq Num 107
(1)00:00:00.000.002.000    Label 242    1355FF45

RX Channel 2, Seq Num 53
(1)00:00:00.000.004.000    Label 054    0FCBF534

RX Channel 3, Seq Num 53
(1)00:00:00.000.006.000    Label 304    7D584923

RX Channel 4, Seq Num 159
(1)00:00:00.000.008.000    Label 110    2ED04D12

RX Channel 4, Seq Num 160
(1)00:00:00.000.010.000    Label 314    51DB0D33

RX Channel 4, Seq Num 161
(1)00:00:00.000.012.000    Label 042    33279844

RX Channel 1, Seq Num 108
(1)00:00:00.000.014.000    Label 036    16A35B78

RX Channel 1, Seq Num 109
(1)00:00:00.000.016.000    Label 242    38CD6945
```

FIG. 21

LSB Nibble Rolling Example

- Roll four bits at a time
  - 0000 0000 0000 0000 -- Message 1
  - 0000 0000 0000 000F -- Message 2
  - 0000 0000 0000 00FF -- Message 3
  - 0000 0000 0000 0FFF -- Message 4
  - 0000 0000 0000 FFFF -- Message 5
  - 0000 0000 000F FFFF -- Message 6
  - 0000 0000 00FF FFFF -- Message 7
  - 0000 0000 0FFF FFFF -- Message 8
  - 0000 0000 FFFF FFFF -- Message 9
  - 0000 000F FFFF FFFF -- Message 10
  - ...
  - FFFF FFFF FFFF FFFF -- Message N

FIG. 23

LSB Bit Rolling Example

- Roll one bit at a time
  - 0000 0000 0000 0000 -- Message 1
  - 0000 0000 0000 0001 -- Message 2
  - 0000 0000 0000 0003 -- Message 3
  - 0000 0000 0000 0007 -- Message 4
  - 0000 0000 0000 000F -- Message 5
  - 0000 0000 0000 001F -- Message 6
  - 0000 0000 0000 003F -- Message 7
  - 0000 0000 0000 007F -- Message 8
  - 0000 0000 0000 00FF -- Message 9
  - 0000 0000 0000 01FF -- Message 10
  - ...
  - FFFF FFFF FFFF FFFF -- Message N

FIG. 22

LSB Byte Rolling Example

- Roll eight bits at a time
  - 0000 0000 0000 0000 0000 – Message 1
  - 0000 0000 0000 0000 00FF – Message 2
  - 0000 0000 0000 0000 FFFF – Message 3
  - 0000 0000 0000 00FF FFFF – Message 4
  - 0000 0000 0000 FFFF FFFF – Message 5
  - 0000 0000 00FF FFFF FFFF – Message 6
  - 0000 0000 FFFF FFFF FFFF – Message 7
  - 0000 00FF FFFF FFFF FFFF – Message 8
  - 00FF FFFF FFFF FFFF FFFF – Message 9
  - FFFF FFFF FFFF FFFF FFFF – Message 9

FIG. 24

LSB Word Rolling Example

- Roll 16 bits at a time
  - 0000 0000 0000 0000 0000 – Message 1
  - 0000 0000 0000 0000 FFFF – Message 2
  - 0000 0000 0000 FFFF FFFF – Message 3
  - 0000 0000 FFFF FFFF FFFF – Message 4
  - 0000 FFFF FFFF FFFF FFFF – Message 5
  - FFFF FFFF FFFF FFFF FFFF – Message 5

FIG. 25

LSB Bit at a Time Example

Change one bit at a time
- 0000 0000 0000 0000 – Message 1
- 0000 0000 0000 0001 – Message 2
- 0000 0000 0000 0002 – Message 3
- 0000 0000 0000 0004 – Message 4
- 0000 0000 0000 0008 – Message 5
- 0000 0000 0000 0010 – Message 6
- 0000 0000 0000 0020 – Message 7
- 0000 0000 0000 0040 – Message 8
- 0000 0000 0000 0080 – Message 9
- 0000 0000 0000 0100 – Message 10
- ...
- 8000 0000 0000 0000 – Message N

FIG. 26

LSB Nibble at a Time Example

Change four bits at a time
- 0000 0000 0000 0000 – Message 1
- 0000 0000 0000 000F – Message 2
- 0000 0000 0000 00F0 – Message 3
- 0000 0000 0000 0F00 – Message 4
- 0000 0000 0000 F000 – Message 5
- 0000 0000 000F 0000 – Message 6
- 0000 0000 00F0 0000 – Message 7
- 0000 0000 0F00 0000 – Message 8
- 0000 0000 F000 0000 – Message 9
- 0000 000F 0000 0000 – Message 10
- ...
- F000 0000 0000 0000 – Message N

FIG. 27

LSB Byte at a Time Example

- Change eight bits at a time
  - 0000 0000 0000 0000 0000 – Message 1
  - 0000 0000 0000 00FF – Message 2
  - 0000 0000 0000 FF00 – Message 3
  - 0000 0000 00FF 0000 – Message 4
  - 0000 0000 FF00 0000 – Message 5
  - 0000 00FF 0000 0000 – Message 6
  - 0000 FF00 0000 0000 – Message 7
  - 00FF 0000 0000 0000 – Message 8
  - FF00 0000 0000 0000 – Message 9

FIG. 28

LSB Word at a Time Example

- Change 16 bits at a time
  - 0000 0000 0000 0000 – Message 1
  - 0000 0000 0000 FFFF – Message 2
  - 0000 0000 FFFF 0000 – Message 3
  - 0000 FFFF 0000 0000 – Message 4
  - FFFF 0000 0000 0000 – Message 5

FIG. 29

TACTICAL BUS FUZZ TESTER

BACKGROUND

The present disclosure relates generally to testing methods for line-replaceable units and more particularly to fuzz testing methods of line-replaceable units on tactical buses.

Military and commercial platforms, such as avionics platforms, have a multitude of communication buses that are used to communicate information between various systems. These buses are often referred to as tactical buses and use MILSTD 1553 bus protocol or ARINC 429 bus protocol, for example. The security of these buses and line-replaceable units connected via these buses against cyber-attacks is of growing concern.

Tactical bus fuzzing is a black box testing technique for discovering bugs or vulnerabilities in a system by sending a methodical series of random inputs, both in-band and out-of-band, to a system via one of its tactical bus external interfaces. The system is monitored for anomalous behavior in the form of system crashes or undefined system functionality. Fuzzing is ultimately a black box technique, requiring no access to source code and little insight into the software or system. Once a crash or undefined system behavior is detected, one needs still to determine the reasons for the system crash.

SUMMARY

According to one embodiment, a method of testing a target device includes: coupling a fuzzer to a bus between a source device and the target device; recording, at the fuzzer, data received at the target device from the source device; creating a first fuzzed message having a data structure of the recorded data; sending the first fuzzed message from the fuzzer to the target device over the bus; monitoring, at a monitor, the target device for an anomalous response to the first fuzzed message; and determining a vulnerability of the target device from the response to the fuzzed message.

According to another embodiment, an apparatus for testing a target device includes: a fuzzer connectable to the target device via a tactical bus, the fuzzer configured to: record messages sent from a source device to the target device over the tactical bus, create a first fuzzed message having a data structure of the recorded message, and send the first fuzzed message to the target device over the tactical bus; and a fuzzer monitor connectable to the tactical bus, the fuzzer monitor configured to: monitor the target device for an anomalous response to the first fuzzed message, and determine a vulnerability of the target device from the response to the first fuzzed message.

According to yet another embodiment, a computer-readable medium having instructions stored thereon that when read by a processor, cause the processor to perform a method of testing a target device, the method including: recording data received at the target device from a source device; creating a first fuzzed message having a data structure of the recorded data; sending the first fuzzed message to the target device; monitoring the target device for an anomalous response to the first fuzzed message; and determining a vulnerability of the target device from the response to the first fuzzed message.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 5 illustrates an operation for creating fuzzed MIL-STD 1553 messages using a least significant bit rolling fuzzing method;

FIG. 8 illustrates an operation for creating fuzzed MIL-STD 1553 messages using a most significant bit single rolling 'F' fuzzing method;

FIG. 11 illustrates an operation for creating fuzzed MIL-STD 1553 messages using a protocol fuzzing method;

FIG. 13 shows a word format for ARINC 429 data words;

FIG. 14 illustrates an operation for creating fuzzed ARINC 429 messages using a random number generation fuzzing method;

FIG. 19 illustrates an operation for creating fuzzed ARINC 429 messages using a message least significant bit (LSB) single '1' fuzzing method;

FIG. 21 illustrate a data rate fuzzing method in which the received message is duplicated in the fuzzed message and sent to the target LRU at a different data rate;

FIG. 22 shows an example of LSB bit rolling;

FIG. 23 shows an example of LSB nibble rolling;

FIG. 24 shows an example of LSB byte rolling;

FIG. 25 shows an example of LSB word rolling;

FIG. 26 shows an example of LSB bit at a time rolling;

FIG. 27 shows an example of LSB nibble at a time rolling;

FIG. 28 shows an example of LSB byte at a time rolling; and

FIG. 29 shows an example of LSB word at a time rolling.

DETAILED DESCRIPTION

The present disclosure provides a tactical bus fuzzer for testing one or more line-replaceable units (LRUs) and/or other equipment in a tactical system. A LRU is a modular component of an airplane, ship, spacecraft, etc., and can be easily changed out at any location or time.

In an embodiment of the present invention, a tactical bus fuzzer provides a methodical series of random inputs to a target LRU in order to observe a response of the target LRU to the random or pseudo-random input. The random or pseudo-random input creates what is referred to as a fuzzed message file or a fuzzball. The fuzzed message file can be completely random with no knowledge of what the expected input should look like, or it can be created to look like valid input to the target LRU with some alterations. In one embodiment, a testing system includes a fuzzer configured to generate a plurality of messages defined by a tactical bus protocol and fill those messages with random data (referred to as "dumb fuzzing"). The fuzzer is also able to capture a message being sent to the target LRU over a tactical bus, manipulate the data defined in the captured message to create a fuzzed message, and send the fuzzed message along the tactical bus to the target LRU (referred to as "smart fuzzing"). The testing system further includes a monitor that records and evaluates a reaction of the target LRU to the fuzzed message. The monitor can signal to the fuzzer when anomalous behavior, such as a system crash, occurs in order to indicate to the fuzzer which fuzzed message causes the anomalous behavior. Working with the monitor, the fuzzer is then able to refine and send subsequent fuzzed message files and observe reactions of the target LRU in order to determine a minimally altered message or set of messages that result in the anomalous behavior. In this manner, the fuzzer and monitor are able to determine a vulnerability of the target LRU to cyber-attacks, for example. Software or hardware fixes can then be made to the target LRU based on the determined vulnerability in order to make the target LRU resistant to cyber-attacks. The structure or bit deviation of the fuzzed message that causes a system crash can indicate what software or hardware fixes need to be made. It is to be understood that many devices besides a LRU can also be tested using the methods disclosed herein.

Figure 1:
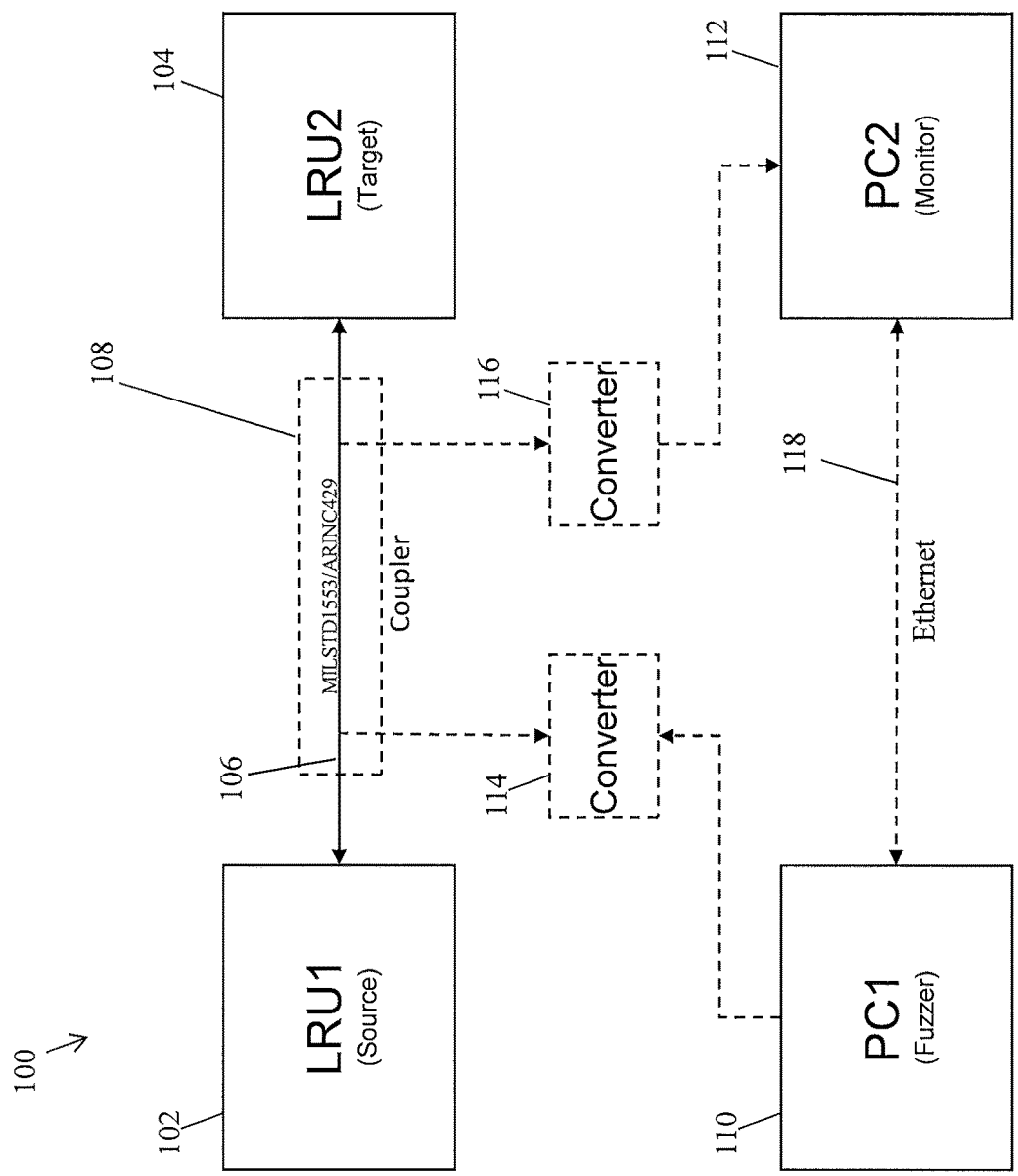
FIG. 1 illustrates a schematic diagram of a tactical bus fuzz testing system in one embodiment of the present invention.

FIG. 1 illustrates a schematic diagram of a typical tactical bus fuzz testing system 100 in one embodiment of the invention. The system includes a source LRU (LRU1) 102 and a target LRU (LRU2) 104. When the system under test is not being tested by the tactical bus fuzz tester, the source LRU 102 can send or transmit data to the target LRU 104 or multiple target LRUs similar to 104 via a tactical bus 106. The bus 106 may use various protocols, such as the MIL-STD 1553 bus protocol or the ARINC 429 bus protocol, for example. The tactical bus fuzz testing system 100 tests the operation of the target LRU 104 by tapping into the bus 106 via a suitable coupler 108. Elements in dashed lines indicate those elements that are connected or spliced into the tactical bus 106 in order to perform the bus fuzz testing methods disclosed herein. The tactical bus fuzz testing system 100 further includes a fuzzer 110 and a monitor 112. The fuzzer 110 connects to the bus 106 via the coupler 108 and a converter 114 that converts between the protocol of the tactical bus 106 (e.g., MILSTD 1553 and ARINC 429 protocol) and the protocol of the fuzzer 110 (e.g., the Ethernet protocol). Similarly, monitor 112 taps into the bus 106 via the coupler 108 and a converter 116 that converts between the two protocols similar to converter 114. The monitor 112 is able to communicate to the fuzzer 110 via a selected protocol such as Ethernet protocol over communication channel 118.

Figure 2:
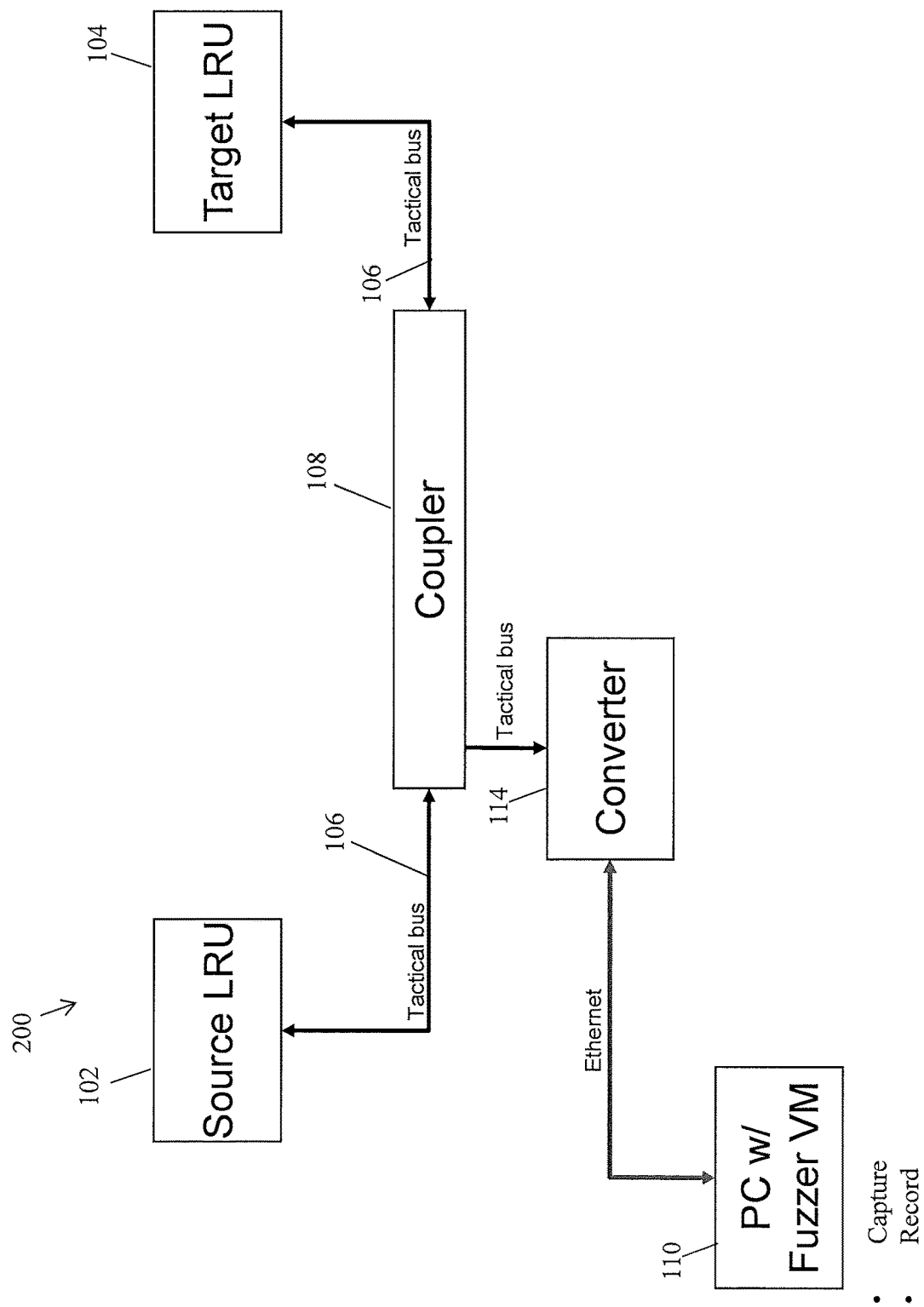
FIG. 2 schematically illustrates an architectural diagram for a first stage of a bus fuzz testing method according to an embodiment of the present invention.

FIG. 2 schematically illustrates an architectural diagram 200 for a first stage of a bus fuzz testing method for a MILSTD 1553 protocol system according to an embodiment of the present invention. In the first stage, the fuzzer 110 captures and records data traffic being sent between source LRU 102 and target LRU 104 along bus 106. Coupler 108 is used to obtain a copy of the data traffic being sent along the bus 106. The fuzzer 110 is connected to the coupler 108 via converter 114. In various embodiments, the fuzzer 110 includes a fuzzer software or virtual machine (VM) operating on a processor. In various embodiments, the processor may be included in a computer, desktop computer, laptop computer, smartphone, etc. The converter 114 converts between, in the example embodiment, the MILSTD 1553 protocol used by the source LRU 102 and target LRU 104 and the Ethernet protocol used by the fuzzer 110.

Figure 3:
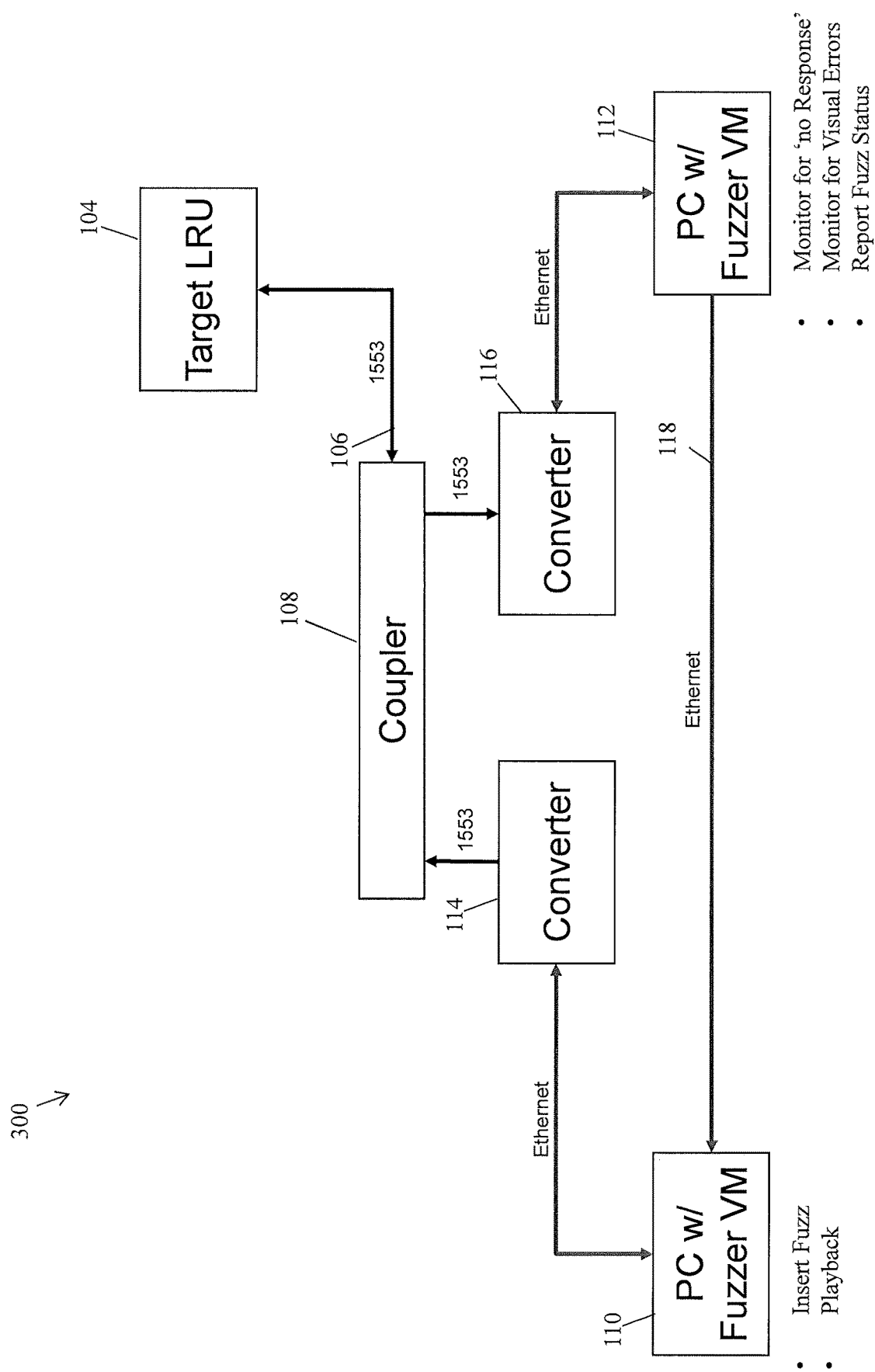
FIG. 3 schematically illustrates a ARINC 429 architectural diagram for a second stage of the bus fuzz testing method according to an embodiment of the present invention.
Figure 3A:
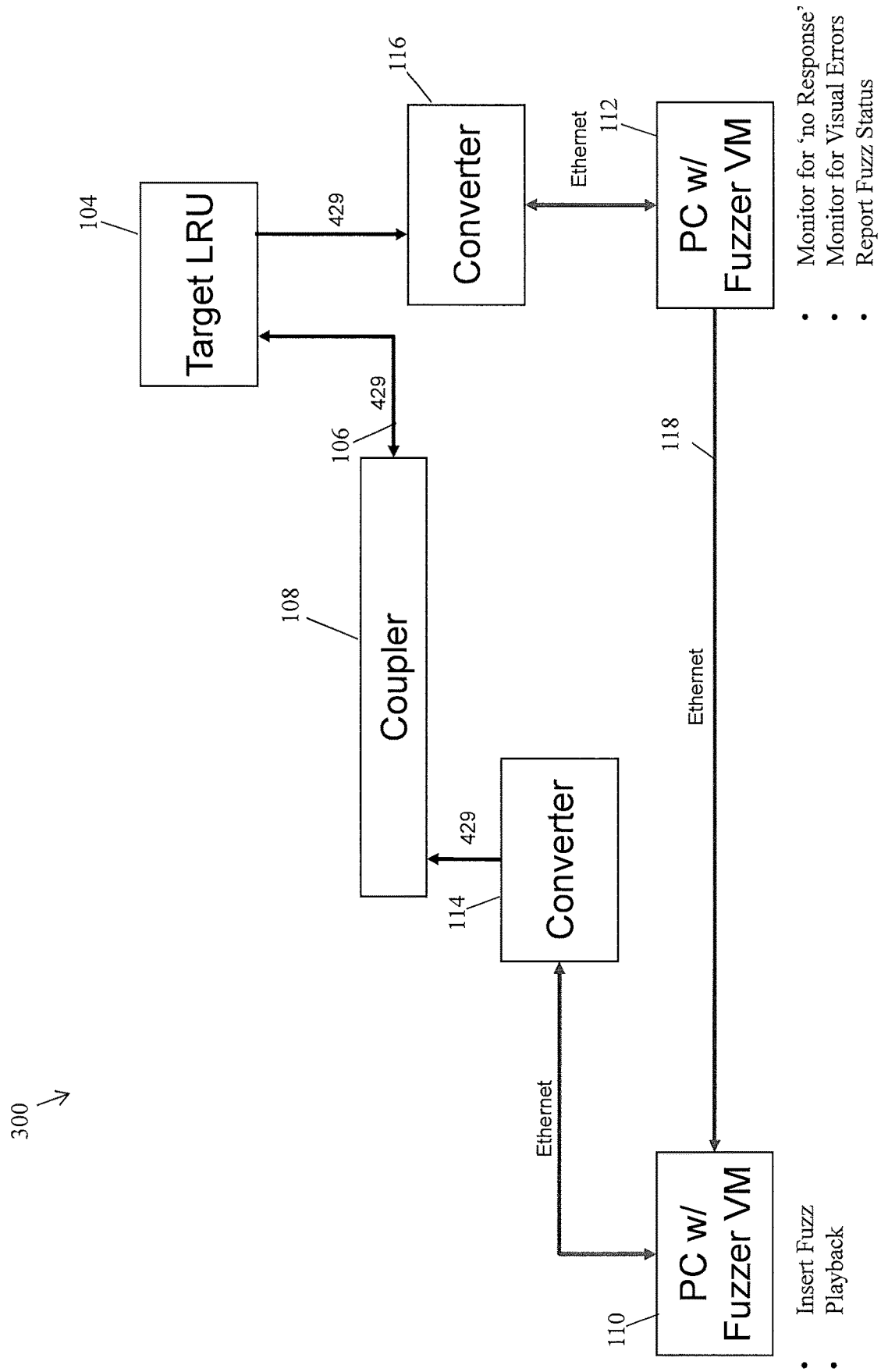
FIG. 3A schematically illustrates a MILSTD 1553 architectural diagram for a second stage of the bus fuzz testing method according to an embodiment of the present invention.

FIG. 3 schematically illustrates an architectural diagram 300 for a second stage of the bus fuzz testing method according to an embodiment of the present invention. In the second stage, the source LRU 102 has been removed from the bus 106. The fuzzer 110 sends a fuzzed message to the target LRU 104 via converter 114 and coupler 108. A "fuzzed message" refers to a message that includes noise at the bit level. The noise can be randomly generated bits or bits that are systematically altered. The fuzzed message file can be based on the data traffic received by the fuzzer 110 during the first stage. The monitor 112 monitors the target LRU 104 via converter 116 and coupler 108. In various embodiments, the monitor 112 detects anomalous behavior of the target LRU 104 by measuring output from various interface/ports on the target LRU 104. In various embodiments, the monitor 112 includes a monitoring software or virtual machine (VM) operating on a processor, which can be a processor included in a computer, desktop computer, laptop computer, smartphone, etc.

The monitor 112 monitors the response of the target LRU 104 to the fuzzed message file. In particular, the monitor 112 checks for an anomalous response at the target LRU 104 to the fuzzed message file. The anomalous response can be a 'no response' behavior at the target LRU 104, such as a system crash, a system hang-up, unexpected results, invalid and/or error responses, etc. The monitor 112 can then signal the fuzzer 110 to indicate a location in the fuzzed message stream that corresponds to the anomalous response. This indication allows the fuzzer 110 to develop a test case (i.e., another fuzzed message file) altered from the original fuzzed message file that caused the 'no response' behavior in order to determine a message or sequence of messages that cause failure to occur at the target LRU 104. The test case can be designed to have a narrower scope in its effect on the target LRU 104 than the previous fuzzed message file. In other words, the second fuzzed message file can be designed to deviate from a captured message file from the first stage less than the first fuzzed message file deviates from the capture message file.

In some embodiments, the anomalous response can be a visual response, i.e., a response that is observed directly by an operator or technician. Thus, the operator can determine that a fuzzed message file sent from the fuzzer 110 to the target LRU 104 causes the anomalous behavior and can request further inspection and narrowing of the fuzzed message file to determine the root cause of this behavior.

The fuzzer 110 can provide message inputs to the target LRU 104 either in-band or out-of-band. With in-band tactical bus fuzzing, tactical bus traffic is captured, recorded, and manipulated ("fuzzed") in the first stage, and replayed to the target LRU 104 in the second stage. A captured message file is mutated randomly to provide noised input (i.e., a fuzzed message file) to the target LRU 104. With out-of-band fuzzing, tactical bus traffic is captured, recorded, and analysed during the first stage. The fuzzer 110 looks at what messages defined within the message protocol are not being sent to the target system (i.e. out-of-band messages), and then randomly generates data for these out-of-band messages to fit within the protocol.

Evolutionary fuzzing allows the fuzzer 110 to determine a specific message or set of messages that cause anomalous behavior at the target LRU 104. A fuzzed message that causes anomalous behaviour at the target LRU 104 may include one or more bits that actually cause the anomalous behavior, while the remaining bits do not contribute to causing the anomalous behavior. Using evolutionary fuzzing, a second fuzzed message file can be created from a first fuzzed message file that causes the anomalous behavior. The second fuzzed message file may have a different set of fuzzed messages than the first fuzzed message file or be created using a different fuzzing method. By iteratively producing message files of successively narrower scope with respect to the response at the target LRU 104, the fuzzer 110 can determine which, or substantially which, bits cause the anomalous behavior. In various embodiments, the monitor 112 is able to notify the fuzzer 110 of a specific place in the message stream corresponding to a system crash at the target LRU 104. This allows for the fuzzer 110 to determine an exact message and format that causes the anomalous behavior. Various different fuzzing scenarios are discussed below with respect to FIGS. 4-11 and 13-21. FIGS. 4-11 illustrate fuzzing scenarios that are specified to the MILSTD 1553 bus protocol. FIGS. 13-21 illustrate fuzzing scenarios that are specific to the ARINC 429 bus protocol.

Figure 4:
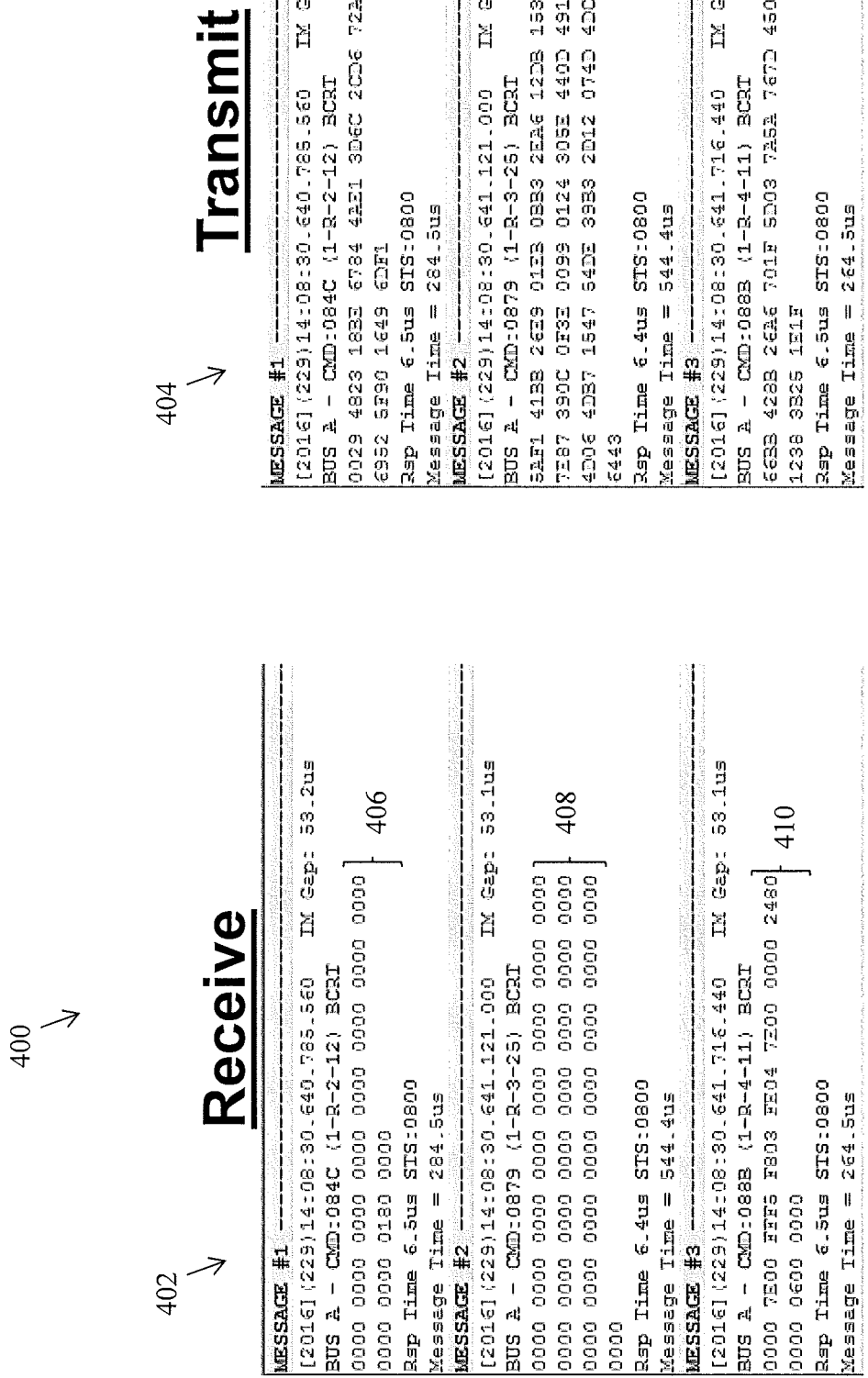
FIG. 4 illustrates an operation for creating fuzzed MIL-STD 1553 messages using a random number generation fuzzing method.

FIG. 4 illustrates an operation 400 for creating fuzzed MILSTD 1553 messages using a random number generation fuzzing method. An illustrative captured data file 402 is shown that is recorded from the source LRU 102 by the fuzzer 110 during the first stage of the testing method. The illustrative captured data file 402 may be defined by a template that defines a structure for one or more messages, with each message having an individual number of bits. The template includes in-band messages (e.g., Message 1, Message 2, Message 3) and may also include out-of-band messages (not shown) which include messages within the template structure that are not being used during a particular instantiation of the captured data file 402.

A fuzzed data file 404 includes the same number of in-band messages as the recorded captured data file 402. Each in-band message of fuzzed data file 404 has a same bit count (i.e., number of bits) as the corresponding message in captured data file 402. However, the bits in the in-band messages of fuzzed data file 404 are randomly generated and are not related to the bits in the messages of captured data file 402. Compare, for example, bits 406, 408 and 410 of captured data file 402, respectively, with bits 416, 418 and 420 of fuzzed data file 404. For in-band testing during the second stage, the fuzzer 110 sends the fuzzed data file 404 to the target LRU 104 to determine a response of the target LRU 104. For out-of-band testing, all data within the protocol for captured data file 402 is filled with randomly generated data regardless of whether the originally captured data file 402 uses all bits available within the captured data file 402.

FIG. 5 illustrates an operation 500 for creating fuzzed MILSTD 1553 messages using a least significant bit (LSB) rolling fuzzing method. Captured data file 502 sent from the source LRU 102 is recorded at the fuzzer 110 during a first stage. The illustrative captured data file 502 includes a single message having 16 hexadecimal digits. Fuzzed data file 504 represents a message stream that has been fuzzed according to the LSB rolling fuzzing method. The number of messages in data file 504 is equal to one plus the number of hexadecimal digits in the message of the captured data file 502. For the illustrative example, data file 504 includes 17 messages. The bits 508 of the first message (Message 1) are duplicates of the bits 506 of the first message of captured data file 502. The bits 510 of second message (Message 2) of data file 504 are formed by duplicating the bits 508 of Message 1 and then replacing the least significant digit with 'F' (hexadecimal 16). In the third message (Message 3), the bits 512 are formed by duplicating bits 510 of Message 2 and replacing the next least significant digit with 'F'. In the fourth message (Message 4), bits 514 are formed by duplicating bits 512 of Message 3 and replacing the next least significant digit with 'F'. This process continues for each successive message in data file 504 until the last message (Message 17). In this manner the 'F's are "rolled" from the least significant bit to the most significant bit. In Message 17, all of the bits 520 have been converted to 'F'. For in-band testing, the amount of bits rolled is equal to amount of bits captured during the first stage. For out-of-band testing, all data within the protocol for a given message is rolled regardless of whether captured message uses all bits that are available.

Figure 6:
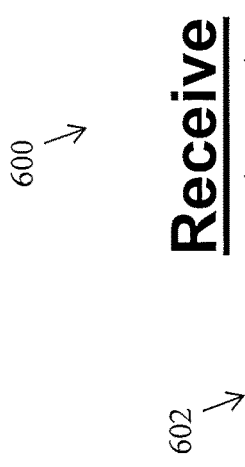
FIG. 6 illustrates an operation for creating fuzzed MIL-STD 1553 messages using a most significant bit rolling fuzzing method.

FIG. 6 illustrates an operation 600 for creating fuzzed MILSTD 1553 messages using a most significant bit (MSB) rolling fuzzing method. Operation of the MSB rolling fuzzing method is opposite to the operation of the LSB rolling fuzzing method. In particular, the 'F's are rolled from the most significant bit to the least significant bit in the MSB rolling fuzzing method with each successive message until all of the bits have been converted to 'F'. Observing the bits 606 of captured data file 602, bits 608 (Message 1) of data file 604 are duplicates of bits 606. Bits 610 (Message 2) are formed by duplicating bits 608 of Message 1 and then replacing the most significant digit of Message 2 with 'F'. Bits 612 are formed by duplicating bits 610 and then replacing the next most significant digit with 'F'. Bits 614 are formed by duplicating bits 612 and then replacing the next most significant digit with 'F'. This process continues for each successive message in data file 604 until the last message (Message 17) for which all bits 620 have been converted to 'F'. For in-band testing, the amount of bits rolled is equal to amount of bits captured during the first stage. For out-of-band testing, all data within the protocol for a given message is rolled regardless of whether captured message uses all bits that are available.

Figure 7:
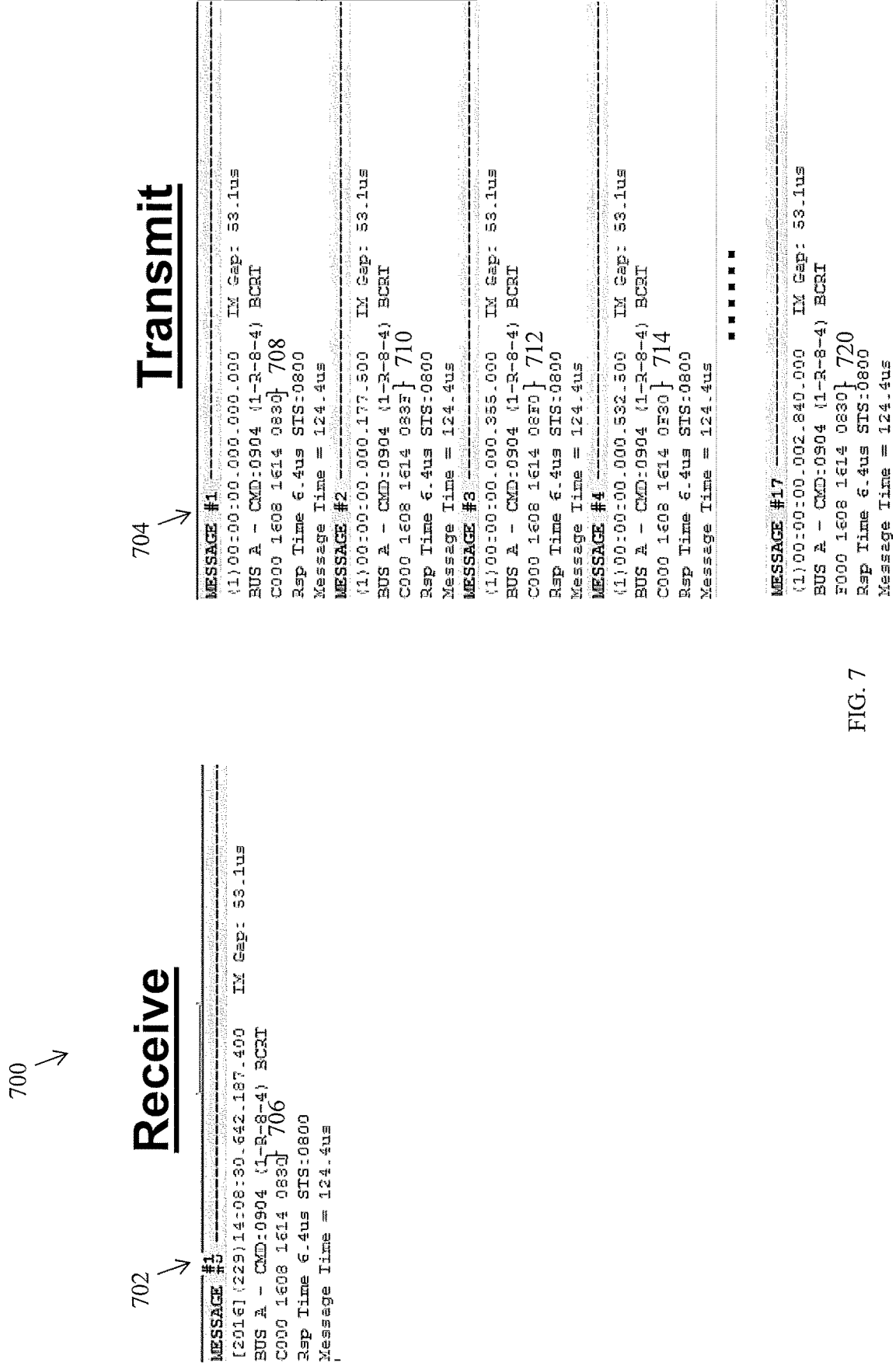
FIG. 7 illustrates an operation for creating fuzzed MIL-STD 1553 messages using a least significant bit single 'F' fuzzing method.

FIG. 7 illustrates an operation 700 for creating fuzzed MILSTD 1553 messages using a least significant bit (LSB) single 'F' fuzzing method. Illustrative captured data file 702 is shown having a single message (Message 1) including 16 hexadecimal digits. Data file 704 represents a message stream that has been fuzzed according to the LSB single "F" fuzzing method. The number of messages in data file 704 is equal to one plus the number of hexadecimal digits in the message of the captured data file 702. Therefore, illustrative data file 704 includes 17 messages. The bits 708 of the first message (Message 1) of data file 704 are duplicates of the bits 706 of the message of captured data file 702. The bits 710 of second message (Message 2) of data file 704 are formed by duplicating the bits 708 of Message 1 and then replacing only the least significant digit with 'F'. The bits 712 of third message (Message 3) of data file 704 are formed by duplicating the bits 708 of Message 1 and replacing only the second least significant digit with 'F'. Bits 714 of fourth message (Message 4) of data file 704 are formed by duplicating bits 708 of Message 1 and replacing only the third least significant digit with 'F'. This process continues for each successive message in data file 704 until at the last message, the most significant digit is converted to 'F' with all other bits 720 being duplicates of the bits 708 of Message 1. For in-band testing the 'F' moves through all of the bits used in the original message. For out-of-band testing, the 'F' moves through all possible bit positions within the protocol for a given message regardless of whether the original message uses the bit.

FIG. 8 illustrates an operation 800 for creating MILSTD 1553 fuzzed messages using a most significant bit (MSB) single rolling 'F' fuzzing method. The MSB single 'F' fuzzing method is opposite to the LSB single 'F' fuzzing method in that the operation starts by replacing the most significant bit with 'F' and moving the 'F' from the most significant bit to the least significant bit for each successive message. At the last message, the least significant digit is replaced by 'F' with all other digits being duplicates of the bits of Message 1. Observing the bits 806 of captured data file 802, bits 808 (Message 1) of data file 804 are duplicates of bits 806. Bits 810 (Message 2) are formed by duplicating bits 808 and then replacing the most significant digit with 'F'. Bits 812 (Message 3) are formed by duplicating bits 808 and replacing the second most significant digit with 'F'. Bits 814 are formed by duplicating bits 808 and replacing the third most significant digit with 'F'. This process continues for each successive message in data file 804 until the last message (Message 17) in which only the least significant bit of bits 820 has been converted to 'F', all other bits being duplicates of bits 808. For in-band testing the 'F' moves through all of the bits used in the original message. For out-of-band testing, the 'F' moves through all possible bit positions within the protocol for a given message regardless of whether the original message uses the bit.

Figure 9:
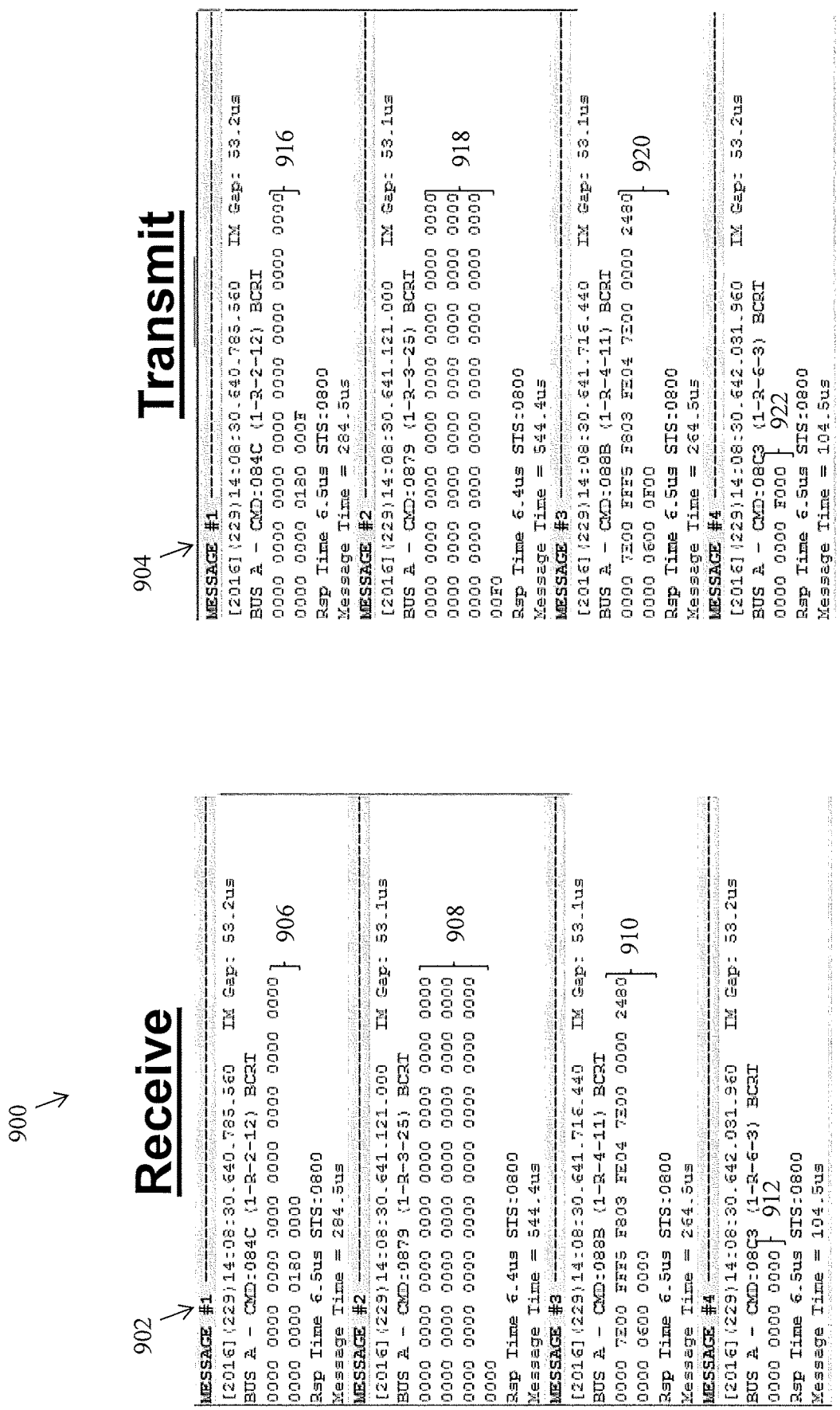
FIG. 9 illustrates an operation for creating fuzzed MIL-STD 1553 messages using a message least significant bit single rolling 'F' fuzzing method.

FIG. 9 illustrates an operation 900 for creating fuzzed MILSTD 1553 messages using a message least significant bit (LSB) single rolling 'F' fuzzing method. Captured data file 902 includes a plurality of messages (i.e., Messages 1-4) with each message having an individual bit stream. Data file 904 includes a fuzzed data file that includes a plurality of messages, with each of the messages of data file 904 having a same bit count as the corresponding message of captured data file 902. The bits 916 of Message 1 of data file 904 is formed by duplicating the bits 906 of Message 1 of captured data file 902 and replacing the least significant digit with an 'F'. The bits 918 of Message 2 of data file 904 are formed by duplicating the bits 908 of Message 2 of captured data file 902 and replacing the second to least significant digit with an 'F'. The bits 920 of Message 3 of data file 904 are formed by duplicating the bits 910 of Message 3 of captured data file 902 and replacing the third least significant digit with an 'F'. This process of bit replacement continues through to the last message. In the illustrative example, the last message is Message 4 and the bits 922 of Message 4 are formed by duplicating the bits 912 of Message 1 of captured data file 902 and replacing the fourth least significant bit with an 'F'. This process of bit replacement continues through to the last message.

Figure 10:
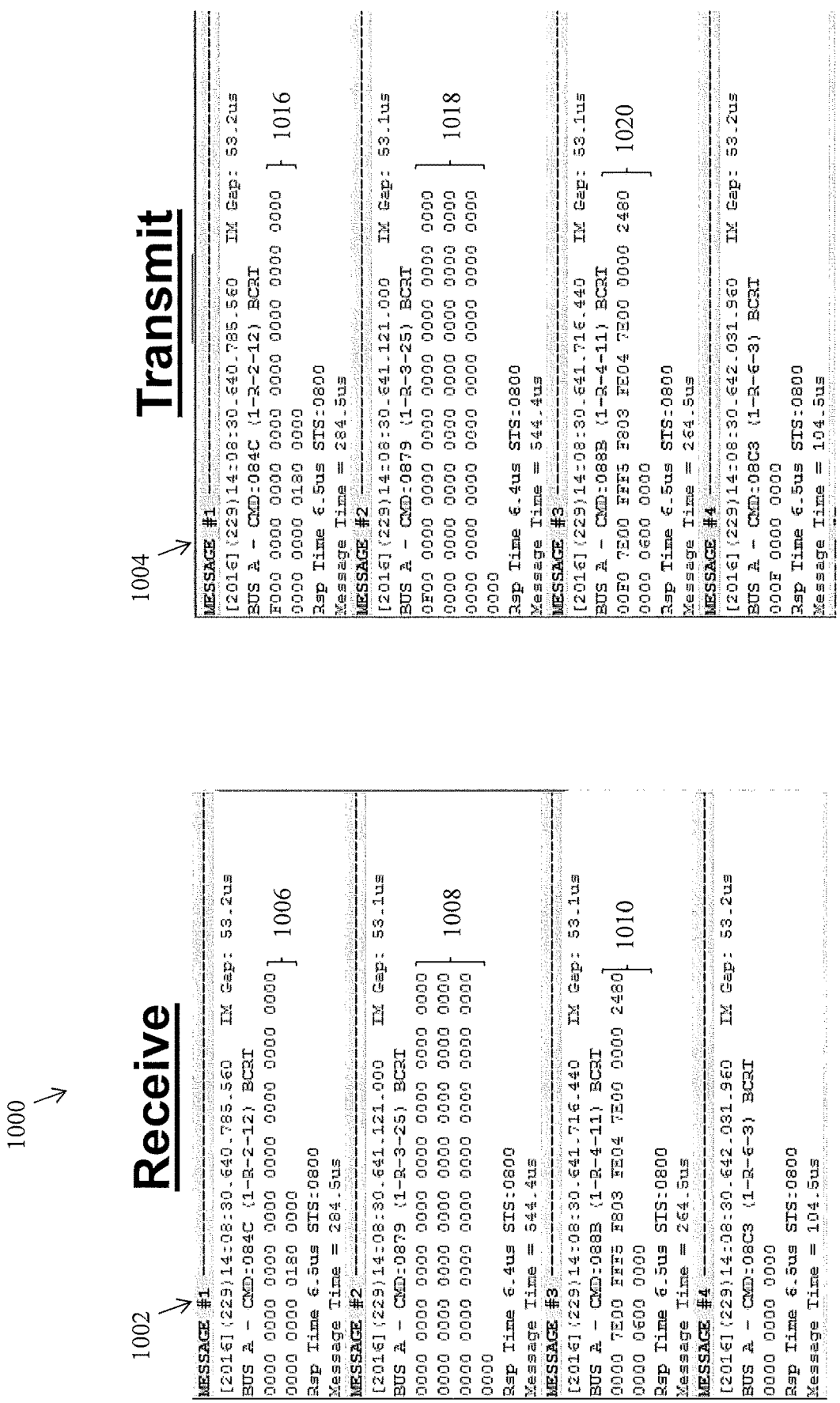
FIG. 10 illustrates an operation for creating fuzzed MIL-STD 1553 messages using a message most significant bit single rolling 'F' fuzzing method.

FIG. 10 illustrates an operation 1000 for creating MILSTD 1553 fuzzed messages using a message most significant bit (MSB) single rolling 'F' fuzzing method, which operates in a direction opposite the message LSB single 'F' fuzzing method. The bits 1016 of Message 1 of data file 1004 are formed by duplicating the bits 1006 of Message 1 of captured data file 1002 and replacing the most significant digit with an 'F'. The bits 1018 of Message 2 of data file 1004 are formed by duplicating the bits 1008 of Message 2 of captured data file 1002 and replacing the second to most significant digit with an 'F'. The bits 1020 of Message 3 of data file 1004 are formed by duplicating the bits 1010 of Message 3 of captured data file 1002 and replacing the third most significant bit with an 'F'. This process of bit replacement continues through to the last message.

FIG. 11 illustrates an operation 1100 for creating MILSTD 1553 fuzzed messages using a protocol fuzzing method. Bits 1106 of captured data file 1102 are duplicated as bits 1106 in a first message of fuzzed data file 1104. Subsequent messages include various mode codes for operating the target LRU 104. The last message in fuzzed data file 1104 is a repeat of the first message.

For the various testing methods described above, the fuzzer 110 provides two modes of operation: automated and non-automated. In non-automated testing, the fuzzer 110 sends a fuzzed message to the target LRU 104 and the user discerns whether there is an anomalous behavior at the target LRU 104 by observing both the monitor output and any output from the target system. If a problem is observed in the non-automated testing, the user can choose to perform another round of fuzzing in order to attempt to identify a root cause. Automated testing provides a method for continually sending fuzzed messages to the target LRU 104. When anomalous behavior is detected by the monitor 112, the monitor sends signal to the fuzzer 110 indicating the fuzzed message that causes the anomalous behavior. When the monitor 112 notifies the fuzzer 110 that an error is detected, the fuzzer 110 begins a process of paring down successive fuzzed messages in order to determine a minimally fuzzed message that produces the anomalous behavior. Paring down a message refers to narrowing the scope of the message by ½ with each iteration, leaving just the half of the message that is suspected to contain the message that caused the anomalous behavior. By paring down the message, the fuzzer eventually determines the part(s) of the message that is(are) causing an error to occur.

It is desirable to be able to reproduce a test case when the target LRU 104 crashes. In one embodiment, the fuzzer 110 is able to reproduce the test case by storing a copy of the test case to a memory location before sending the test case to the target LRU 104. In another embodiment, the monitor 112 is able to capture a location in the message sequence at which the target LRU 104 crashes. This information is then sent from the monitor 112 to the fuzzer 110 to allow the fuzzer 110 to regenerate the test case up to the location at which the target LRU 104 crashed. This allows the fuzzer 110 to determine how the target LRU 104 failed.

Figure 12:
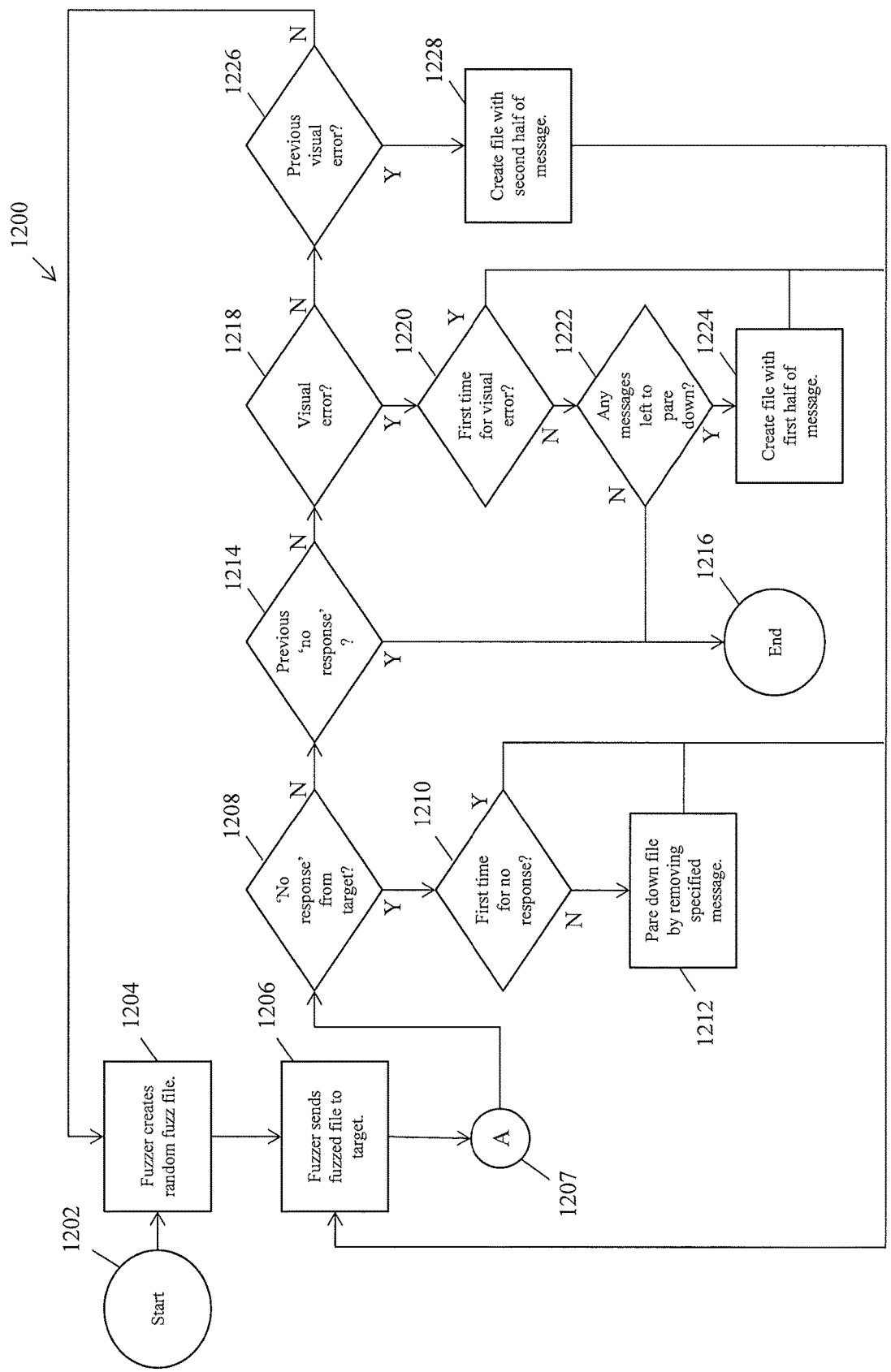
FIG. 12 shows a flow diagram illustrating an automated testing method according to an embodiment of the present invention.

FIG. 12 shows a flow diagram 1200 illustrating an automated testing method according to an embodiment of the present invention. The diagram includes a starting point (Start 1202) at which the automated fuzzing algorithm begins and an ending point (End 1216) at which point a failure mechanism for the target LRU 104 has been identified. FIG. 12 diagrams the decisions and actions taken by the fuzzer 110 during the automated fuzz testing. Only circle A (1207) represents decisions and actions taken by the monitor 112. The decisions and actions represented by circle A (1207) are diagramed in detail in FIG. 12A.

Referring to FIG. 12, from Start 1202 the automated testing method moves to box 1204. In box 1204, the fuzzer 110 creates a random fuzzed file. Then in box 1206, the fuzzer 110 sends the fuzzed data file to the target LRU 104 via converter 114 and coupler 108. The converter 114 converts between the protocol of the target LRU 104 (e.g., MILSTD 1553 and ARINC 429 protocol) and the protocol of the fuzzer 110 (e.g., the Ethernet protocol). The testing method then proceeds to circle A (1207) which is detailed in FIG. 12A.

Figure 12A:
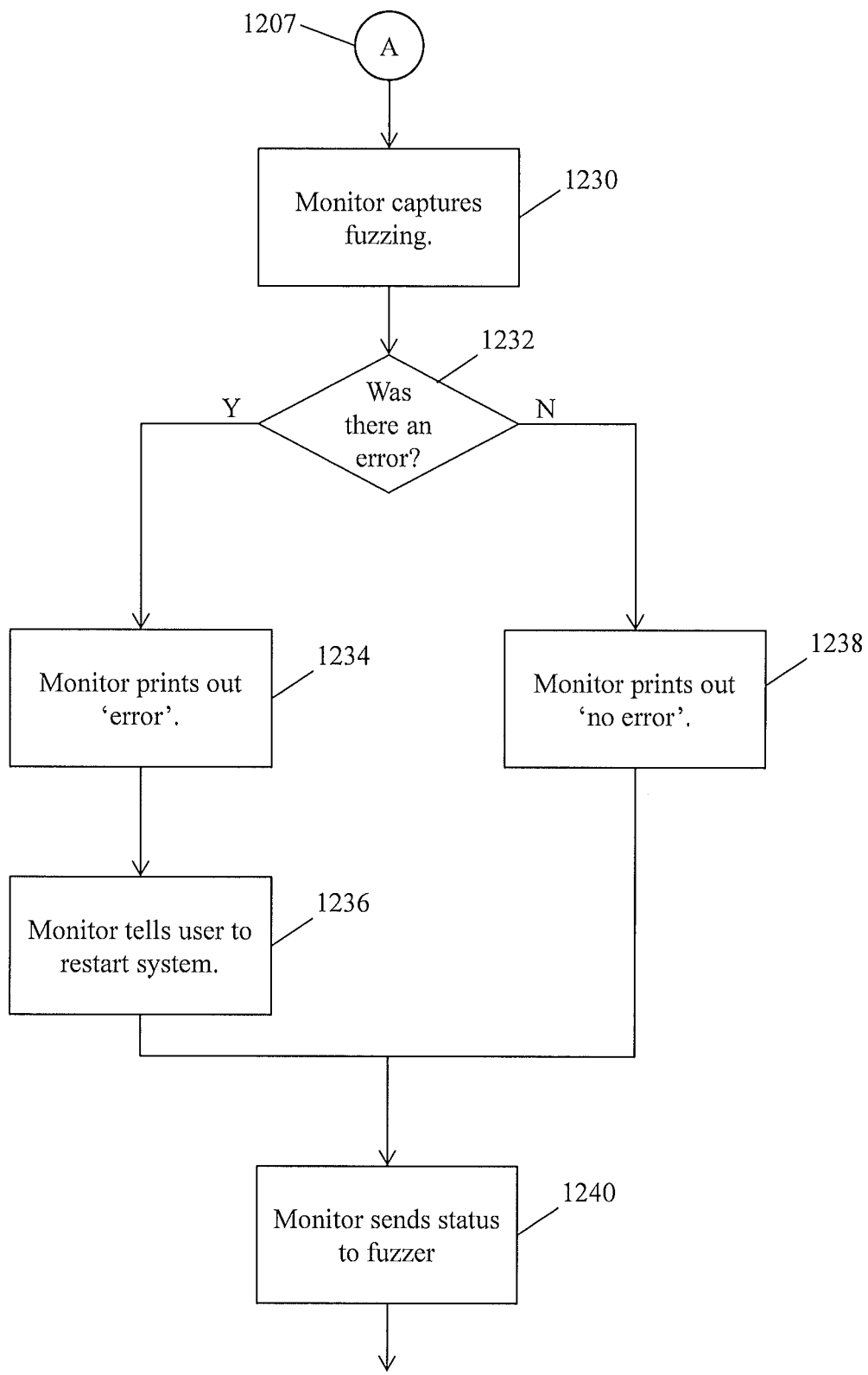
FIG. 12A diagrams decisions and actions made by a monitor with respect to the automated testing method of FIG. 12.

Referring now to FIG. 12A, in box 1230, the monitor 112 captures the fuzzed message of the fuzzer 110 and monitors a response of the target LRU 104. The monitor 112 obtains the response of the target LRU 104 via the coupler 108 and converter 116, which reverses the earlier protocol conversion. In decision box 1232, the monitor 112 determines whether the response of the target LRU 104 constitutes an error. If the response is an error, then in box 1234, the monitor 112 prints out the error and in box 1236, the monitor 112 tells the user to restart the target LRU 104 and acknowledge to continue. If the response is not an error, then in box 1238, the monitor 112 prints out that there is no error. The monitor waits for user's input before signaling the fuzzer 110 to continue. After execution of either box 1236 or box 1238, the method proceeds to box 1240 at which the monitor 112 sends a status of the target LRU 104 to the fuzzer 110 via Ethernet 118. After box 1240, the method proceeds to decision box 1208 of FIG. 12.

Returning to FIG. 12, after the monitor 112 has sent the status to the fuzzer 110, the testing method moves to decision box 1208. In decision box 1208, the monitor 112 determines if the target LRU 104 is in a non-responsive state ("no response") from a return message from target LRU 104 in response to the fuzzed message. (If the target LRU 104 does not response to the fuzzed message, the monitor indicates "no response".) If the target LRU 104 is in a non-responsive state, then in decision box 1210, the fuzzer 110 determines whether this is the first time the target LRU 104 has been put into a non-responsive state. If it is the first time ('Y'), then the testing method returns to box 1206 where the fuzzed data file is sent again. If it is not the first time ('N'), then the testing method proceeds to box 1212. In box 1212, the fuzzer 110 pares down the fuzzed data file by removing a specified message, e.g., the message that caused the target LRU 104 to become non-responsive, the most recently sent message, etc. The testing method then returns to box 1206 which sends the pared down data file to the target LRU 104.

Returning to decision box 1208, if the target LRU 104 is not in a non-responsive state, then the method proceeds to decision box 1214. At decision box 1214, it is determined whether a previous 'no response' message has occurred. If there is a previous 'no response' the testing method proceeds to 'End' circle 1216 to end the automated testing method, indicating that a fuzzed message has been found that causes a system crash or anomalous behavior at the target LRU 104. However, at decision box 1214, if there is no previous 'no response', the testing method proceeds to decision box 1218.

In decision box 1218, it is determined whether or not there is a visual error by prompting the user. The monitor 112 queries the user to determine if the user has observed any visual errors in the output of the target LRU 104. If there is a visual error, then the method proceeds to decision box 1220. In decision box 1220, it is determined whether this is the first time for a visual error. The fuzzer 110 keeps track of whether there was a visual error in a previous state. When the fuzzer 110 is notified of the occurrence of a visual error, it acts according to whether or not there was a previous visual error. If this is the first visual error, the method returns to box 1206 to resend the fuzzed message file. If it is not the first visual error, the method proceeds to decision box 1222. At decision box 1222 if there are no more messages to pare down from the data file, the method proceeds to 'End' circle 1216. Otherwise, if there message file can be pared down further, the method proceeds to box 1224. In box 1224, the method creates a new message file by paring down the message file appropriately. The method then proceeds to box 1206 so that the fuzzer 110 can send the new message file to the target LRU 104.

Returning to decision box 1218, if it is determined that there is no visual error, then the method proceeds to decision box 1226. At decision box 1226, it is determined whether a previous visual error was observed. If there was a previous visual error, the testing method proceeds to decision box 1228. At decision box 1228, the fuzzer 110 creates another message file with the second half of the messages previously used. However, at decision box 1228, if there was no previous visual error, the testing method proceeds to box 1204 to create a new randomly fuzzed message file.

FIG. 13 shows a word format for ARINC 429 data words. Data words for ARINC 429 are 32 bits in length and are made up of five primary fields; parity field (one bit in length), sign/status matrix (SSM) field (two bits), data field (19 bits), source/destination identifier (SDI) field (two bits), and label field (eight bits). As seen in the word format, the least significant bit is on the right hand side and the most significant bit is on the left hand side. When fuzzing an ARINC 429 data word, only the data and the SSM fields are modified (the parity bit may also change, as needed, depending on the values of the fuzz data). FIGS. 14-21 show the results of various fuzzing processes.

FIG. 14 illustrates an operation 1400 for creating fuzzed ARINC 429 messages using a random number generation fuzzing method. An illustrative captured data file is shown in boxed region 1402. Corresponding fuzzed data file is shown in boxed region 1404 and includes the messages from boxed region 1402 with data field and SSM field bits randomly generated.

Figure 15:
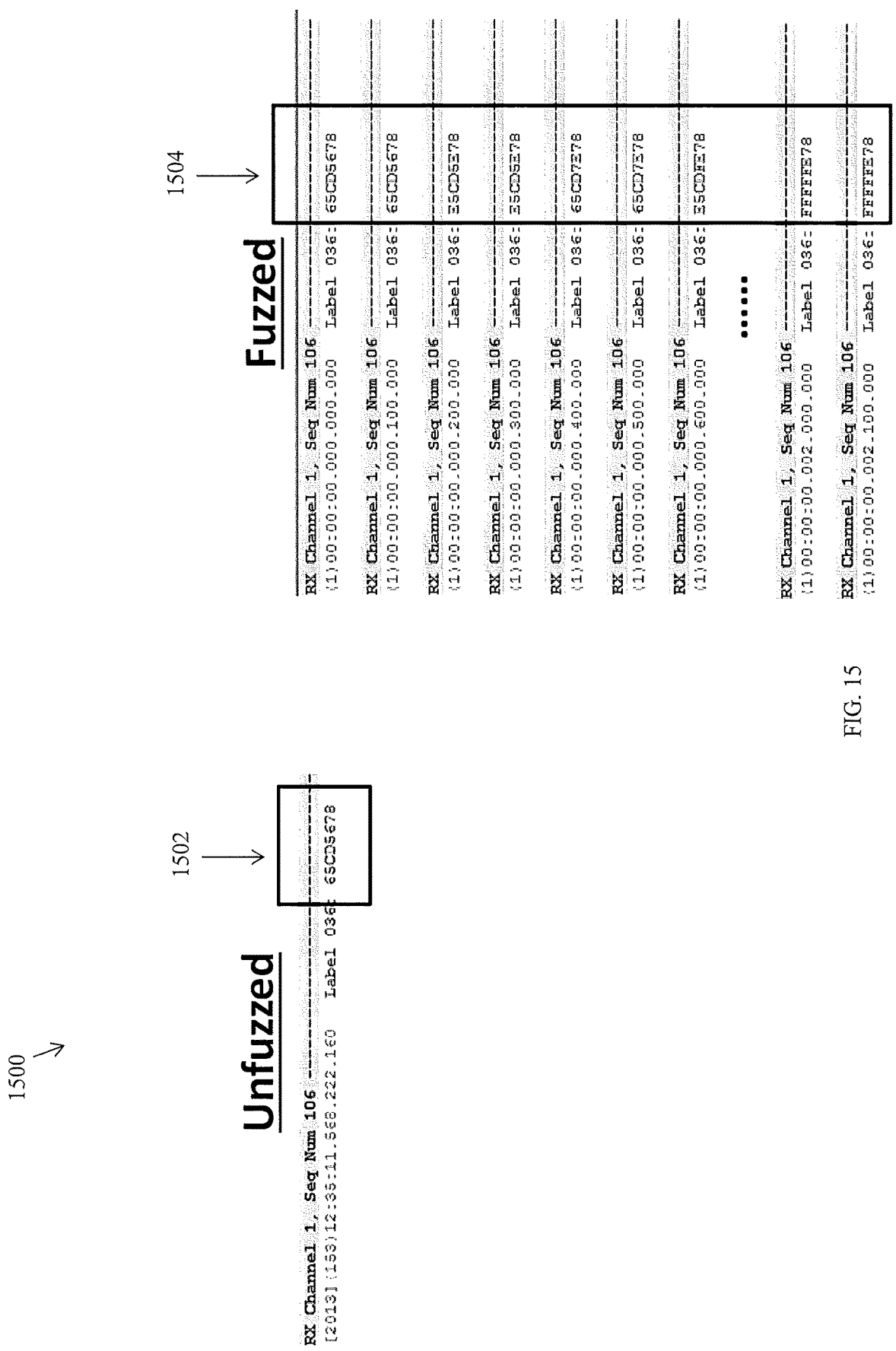
FIG. 15 illustrates an operation for creating fuzzed ARINC 429 messages using a least significant bit (LSB) rolling fuzzing method.

FIG. 15 illustrates an operation 1500 for creating fuzzed ARINC 429 messages using a least significant bit (LSB) rolling fuzzing method. The message in boxed region 1502 is duplicated in the top row of boxed region 1504 and for the next word (second row) the least significant bit is changed from its current state to '1'. This is continued as we move down the column with the next LSB being changed from its current state to '1' until the most significant bit of the SSM field has been changed to '1', resulting in the message at the bottom of the boxed region 1504. In the last message, all of the bits in the SSM and data fields have been flipped to '1'.

Figure 16:
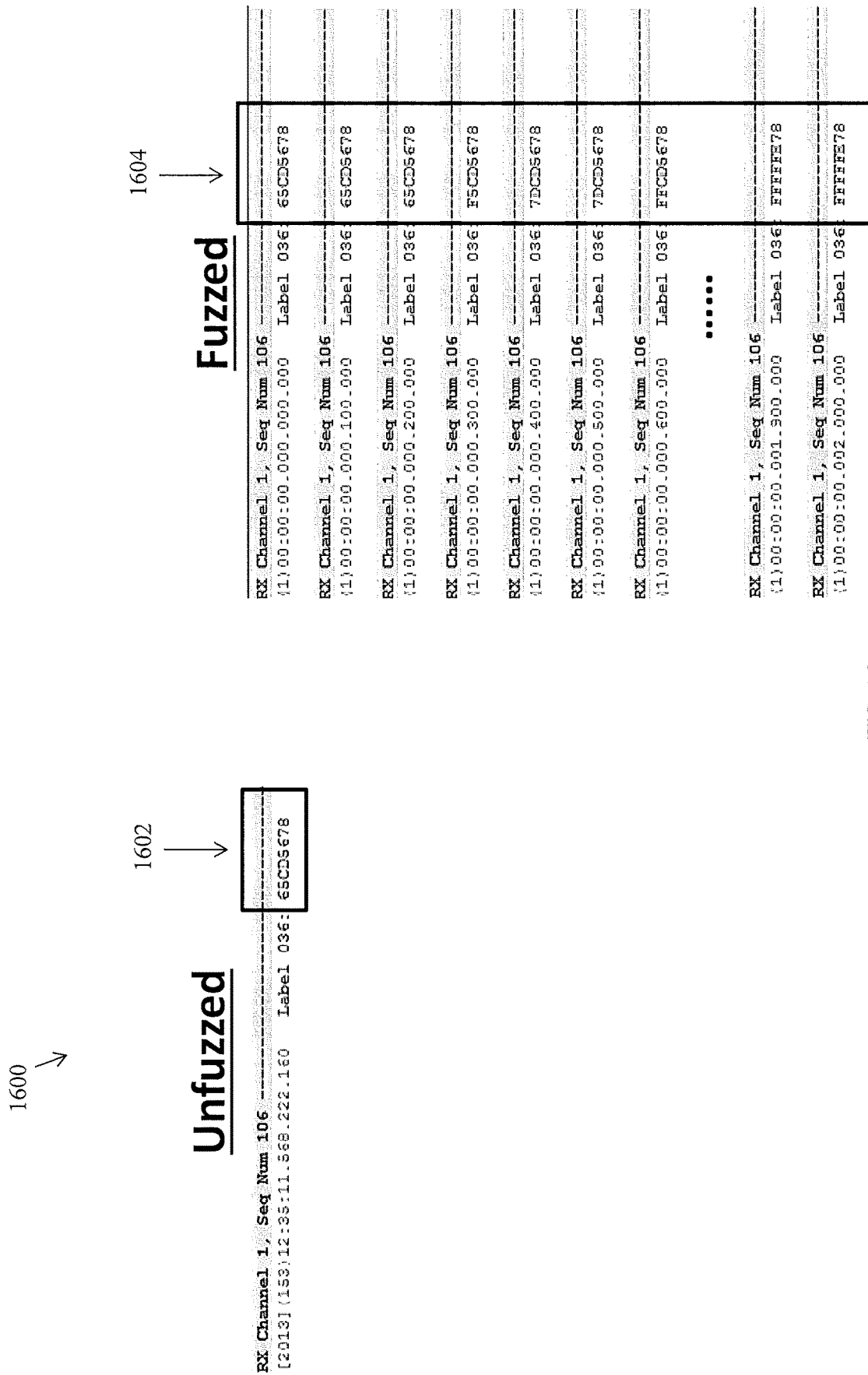
FIG. 16 illustrates an operation for creating fuzzed ARINC 429 messages using a most significant bit (MSB) rolling fuzzing method.

FIG. 16 illustrates an operation 1600 for creating fuzzed ARINC 429 messages using a most significant bit (MSB) rolling fuzzing method. The message in boxed region 1602 is duplicated in the top row of boxed region 1604 and as we move down the column in boxed region 1604 the next most significant bit is changed from its current state to '1'. This is continued until the least significant bit of the data field has been changed to '1', resulting in the message at the bottom of the boxed region 1604. In the last message, all of the bits in the SSM and data fields have been flipped to '1'.

Figure 17:
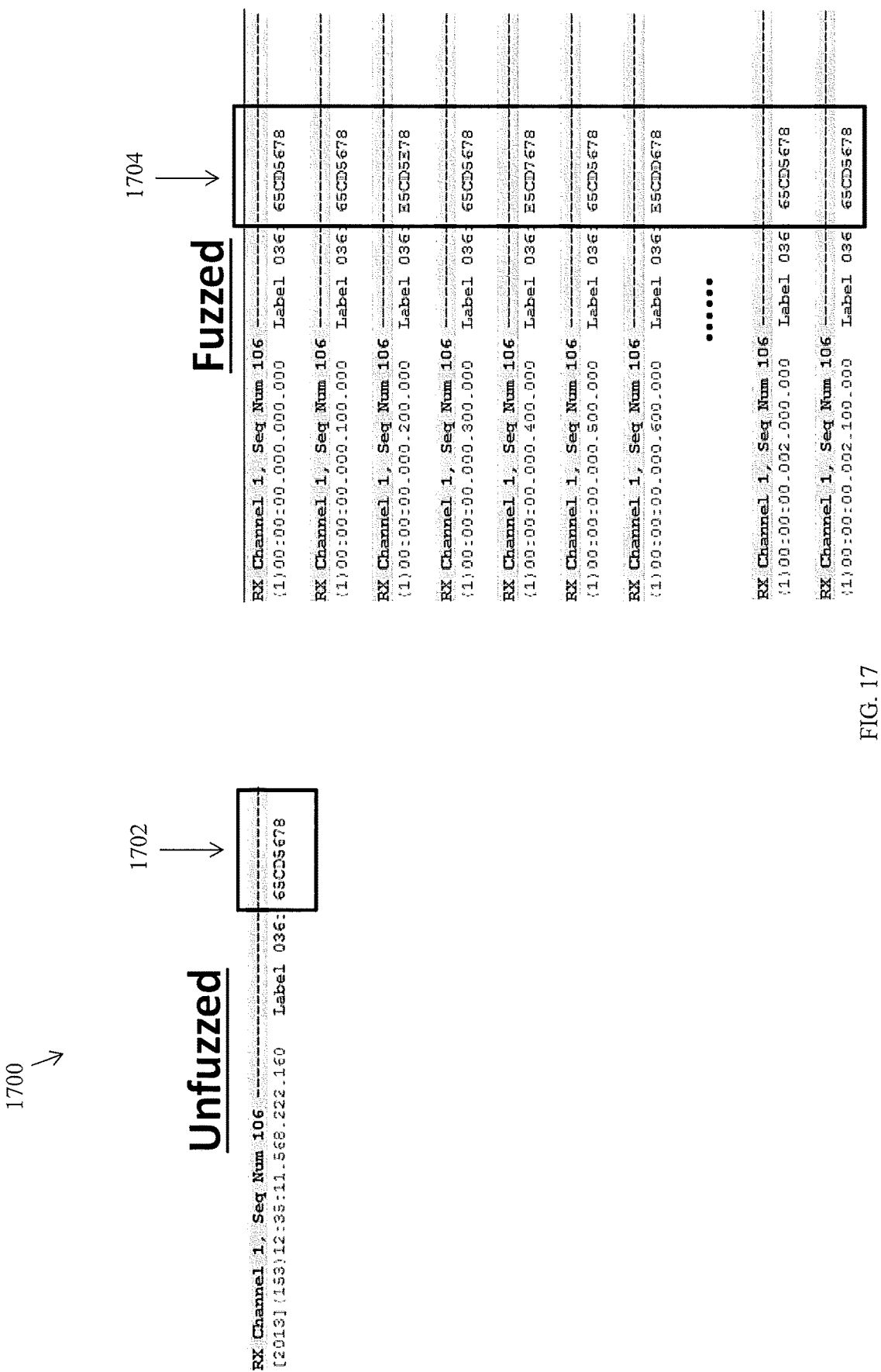
FIG. 17 illustrates an operation for creating fuzzed ARINC 429 messages using a least significant bit (LSB) single '1' fuzzing method.

FIG. 17 illustrates an operation 1700 for creating fuzzed ARINC 429 messages using a least significant bit (LSB) rolling '1' fuzzing method. The message in boxed region 1702 is duplicated in the top row of boxed region 1704. For the second row, the LSB of the data field is switched to '1' leaving all other bits of the message of the first row the same. For the third row, the second-most LSB of the data field is switched to '1' leaving all other bits of the message of the first row the same. This method continues until, in the last row, the most significant bit of the SSM field is switched to '1' leaving all other bits of the message of the first row the same.

Figure 18:
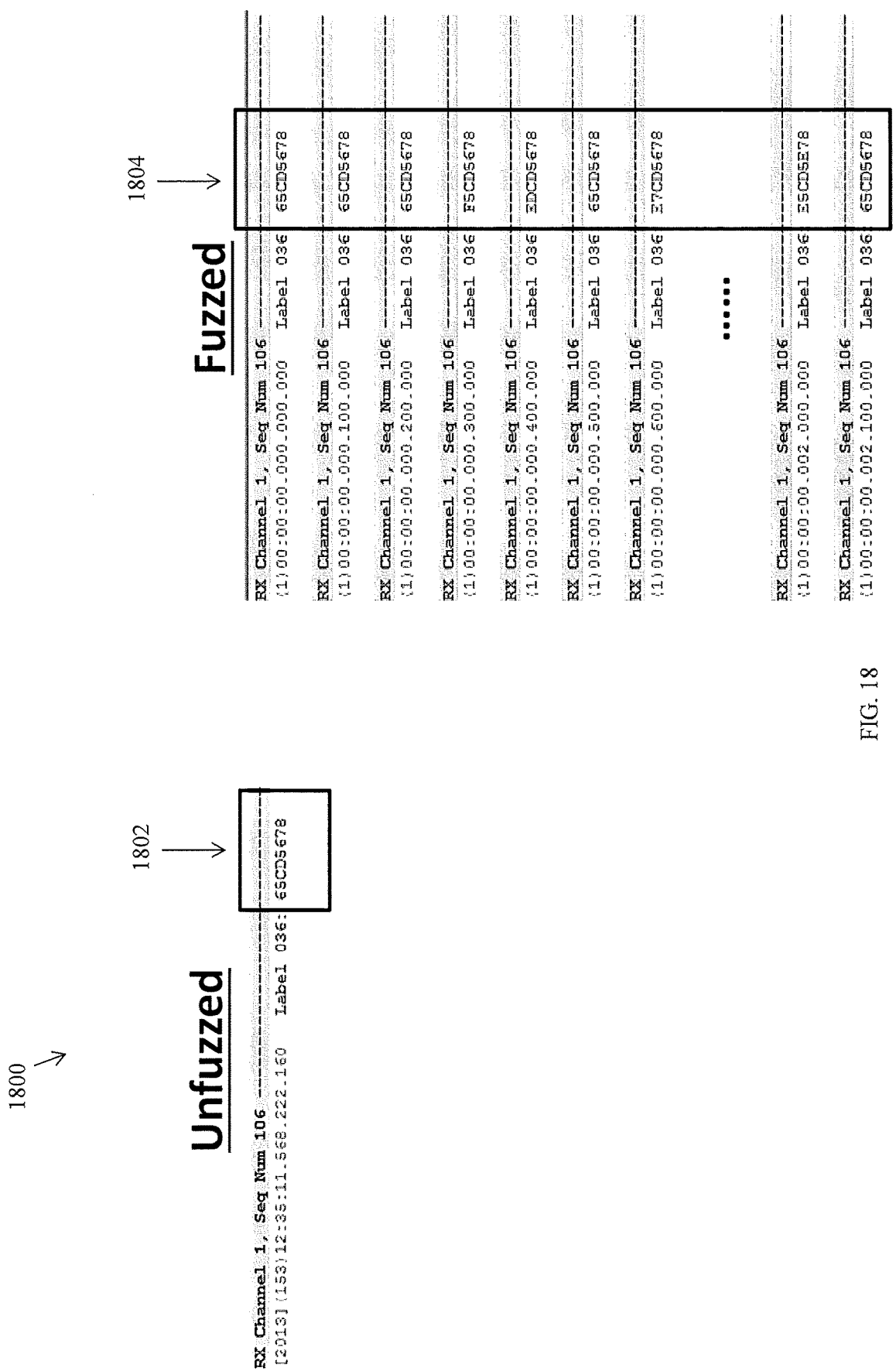
FIG. 18 illustrates an operation for creating fuzzed ARINC 429 messages using a most significant bit (MSB) single '1' fuzzing method.

FIG. 18 illustrates an operation 1800 for creating fuzzed ARINC 429 messages using a most significant bit (MSB) rolling '1' fuzzing method. The message in boxed region 1802 is duplicated in the top row of boxed region 1804. For the second row, the MSB of the SSM field is switched to '1' leaving all other bits of the message of the first row the same. For the third row, the second-most MSB of the SSM field is switched to '1' leaving all other bits of the message of the first row the same. This method continues until, in the last row, the least significant bit of the data field is switched to '1' leaving all other bits of the message of the first row the same.

FIG. 19 illustrates an operation 1900 for creating fuzzed ARINC 429 messages using a message least significant bit (LSB) single '1' fuzzing method. Each message of the boxed region 1902 is duplicated in the boxed region 1904. Starting from the LSB of the data field and moving toward the MSB of the SSM field, a bit is switched to '1', whereas a distance of the switched bit from the LSB corresponds to the order in which the message is received.

Figure 20:
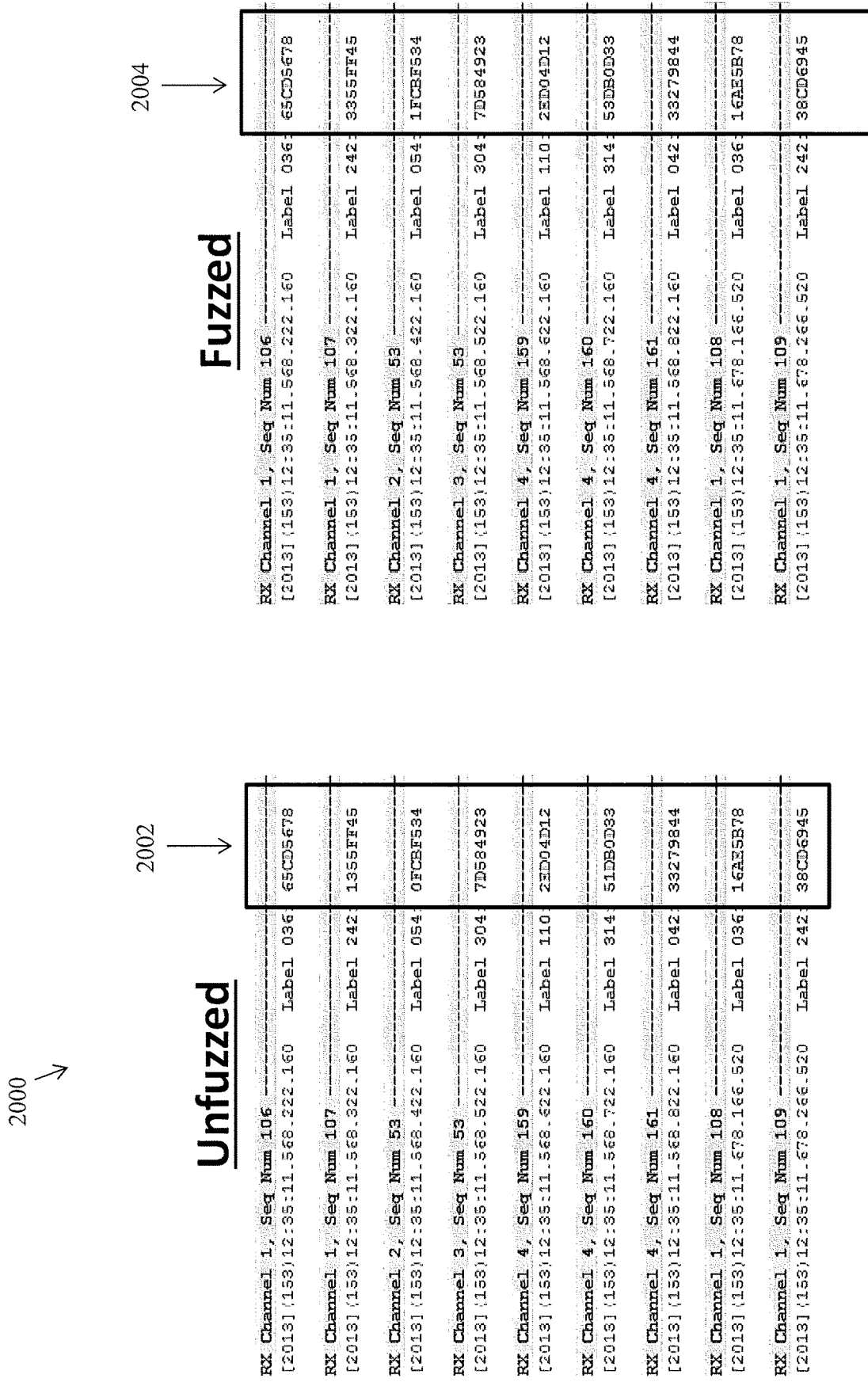
FIG. 20 illustrates an operation for creating fuzzed ARINC 429 messages using a message most significant bit (MSB) single '1' fuzzing method.

FIG. 20 illustrates an operation 2000 for creating fuzzed ARINC 429 messages using a message most significant bit (MSB) single '1' fuzzing method. Each message of the boxed region 2002 is duplicated in the boxed region 2004. Starting from the MSB of the SSM field and moving toward the LSB of the data field, a bit is switched to '1', whereas a distance of the switched bit from the MSB corresponds to the order in which the message is received.

FIG. 21 illustrates a data rate fuzzing method in which the received message (box 2102) is duplicated in the fuzzed message (box 2104) and sent to the target LRU at a different data rate.

The methods disclosed herein discuss only a few possible fuzzing methods. Additional fuzzing methods that can be used with the present invention are outlined in FIGS. 22-29. The fuzzing methods can be performed using various binary groups. A binary group can be a bit, a nibble (4 bits), a byte (8 bits) or a word (16 bits). Fuzzing can be performed using binary group at the bit level by changing one bit at a time (i.e., (0000 0000 0000 0000) to (0000 0000 0000 0001) or 0000 hex to 0001 hex), at the nibble level by changing 4 bits at a time (i.e., (0000 0000 0000 0000) to (0000 0000 0000 1111) or 0000 hex to 000F hex), at a byte level by changing 8 bits at a time (i.e., (0000 0000 0000 0000) to (0000 0000 1111 1111) or 0000 hex to 00FF hex), or at the word level (i.e., (0000 0000 0000 0000) to (1111 1111 1111 1111) or 0000 hex to FFFF hex).

FIG. 22 shows an example of LSB bit rolling. FIG. 23 shows an example of LSB nibble rolling. FIG. 24 shows an example of LSB byte rolling. FIG. 25 shows an example of LSB word rolling.

FIG. 26 shows an example of LSB bit at a time rolling. FIG. 27 shows an example of LSB nibble at a time rolling. FIG. 28 shows an example of LSB byte at a time rolling. FIG. 29 shows an example of LSB word at a time rolling.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method of testing a target device, comprising:
sending data from a source device to the target device over a bus using a first protocol, wherein a first converter for converting between the first protocol and a second protocol is coupled to the bus between the source device and the target device;
receiving a copy of the data at a fuzzer via the first converter, the copy of the data being received at the fuzzer via the converter using the second protocol;
creating a first fuzzed message having a data structure of the received copy of the data;
sending the first fuzzed message from the fuzzer to the target device via the first converter, wherein the first fuzzed message is sent using the second protocol and received using the first protocol, the first converter converting the first fuzzed message form the second protocol to the first protocol;
monitoring, at a monitor, the target device for a response to the first fuzzed message;
providing a signal from the monitor to the fuzzer using the second protocol when the first fuzzed message produces an anomalous response; and
determining a vulnerability of the target device from the response of the target device to the first fuzzed message.

2. The method of claim 1, further comprising creating a second fuzzed message at the fuzzer based on the first fuzzed message, sending the second fuzzed message to the target device, and determining the vulnerability of the target device from the response of the target device to the second fuzzed message, wherein the second fuzzed message has narrower scope than the first fuzzed message.

3. The method of claim 2, wherein a deviation of bits in the second fuzzed message from the data is less than a deviation of bits in the first fuzzed message from the data.

4. The method of claim 2, further comprising identifying a cause of the anomalous response at the target device from at least one of: (i) the first message; and (ii) the second message.

5. The method of claim 1, wherein the first fuzzed message is created using at least one of: (i) a random number generation; (ii) rolling a binary group from a least significant bit to a most significant bit; (iii) rolling a binary group from a most significant bit to a least significant bit; (iv) moving a binary group from a least significant bit to a most significant bit; (v) moving a binary group from a most significant bit to a least significant bit; (vi) moving a binary group in a message data payload from a least significant bit to a most significant bit; (vii) moving a binary group in a message data payload from a most significant bit to a least significant bit; and (viii) inserting protocol fuzzing in a data file.

6. The method of claim 1, wherein the fuzzed message tests at least one of: (i) an in-band message set of the target device; and (ii) an out-of-band message set of the target device.

7. The method of claim 1, wherein the target device includes a plurality of target line replaceable units (LRUs), the method further comprising sending the first fuzzed message from the fuzzer to the plurality of target devices, and monitoring the target devices for an anomalous response to the first fuzzed message.

8. The method of claim 1, further comprising monitoring the target device via a second converter coupling the bus to the monitor, the second converter converting between the first protocol and a second protocol.

9. The method of claim 1, wherein the first protocol is a tactical bus protocol and the second protocol is an Ethernet protocol.

10. An apparatus for testing a target device, comprising:
a first converter configured to couple to a tactical bus between a source device and the target device, the first converter configured to convert between a first protocol and the second protocol, the source device communicating with the target device via the first protocol;
a fuzzer connectable to the target device via the converter, the fuzzer configured to:
record, via the converter, a copy of messages sent from the source device to the target device over the tactical bus, the copy of the messages being received at the fuzzer using the second protocol,
create a first fuzzed message having a data structure of the recorded message, and
send the first fuzzed message to the target device over the tactical bus via the converter, wherein the first converter converts the first fuzzed message from the second protocol to the first protocol;
a fuzzer monitor configured to:
monitor the target device for a response to the first fuzzed message, and
provide a signal to the fuzzer using the second protocol to identify when the first fuzzed message produces an anomalous response;
determine a vulnerability of the target device from the response to the first fuzzed message.

11. The apparatus of claim 10, wherein the fuzzer is further configured to create a second fuzzed message based on the first fuzzed message and send the second fuzzed message to the target device, and the monitor is further configured to determine the vulnerability of the target device from the response of the target device to the second fuzzed message, the second fuzzed message having a narrower scope than the first fuzzed message.

12. The apparatus of claim 11, wherein a deviation of bits in the second fuzzed message from the data is less than a deviation of bits in the first fuzzed message from the data.

13. The apparatus of claim 11, wherein the monitor is further configured to identify a cause of the anomalous response at the target device from at least one of: (i) the first message; and (ii) the second message.

14. The apparatus of claim 10, wherein the first fuzzed message is created using at least one of: (i) a random number generation; (ii) rolling a binary group from a least significant bit to a most significant bit; (iii) rolling a binary group from a most significant bit to a least significant bit; (iv) moving a binary group from a least significant bit to a most significant bit; (v) moving a binary group from a most significant bit to a least significant bit; (vi) moving a binary group in a message data payload from a least significant bit to most a significant bit; (vii) moving a binary group in a message data payload from a most significant bit to a least significant bit; and (viii) inserting protocol fuzzing in a data file.

15. The apparatus of claim 10, wherein the fuzzer sends the fuzzed message to test at least one of: (i) an in-band message set of the target device; and (ii) an out-of-band message set of the target device.

16. A non-transitory computer-readable medium having instructions stored thereon that when read by a processor, cause the processor to perform a method of testing a target device, the method comprising:
recording, for data sent from a source device to the target device via a bus using a first protocol, a copy of the data at a fuzzer via a first converter coupled to the bus between the source device and the target device, wherein the copy of the data is received at the fuzzer using a second protocol, the first converter converting between the first protocol and the second protocol;
creating a first fuzzed message having a data structure of the recorded data;
sending the first fuzzed message from the fuzzer to the target device via the first converter, wherein the first fuzzed message is sent using the second protocol and received using the first protocol, the first converter converting the first fuzzed message from the second protocol to the first protocol;
monitoring the target device for an anomalous response to the first fuzzed message;
providing a signal from the monitor to the fuzzer using the second protocol when the first fuzzed message produces an anomalous response; and
determining a vulnerability of the target device from the response of the target device to the first fuzzed message.

17. The non-transitory computer-readable medium of claim 16, wherein the method further comprises creating a second fuzzed message at the fuzzer based on the fuzzed message, sending the second fuzzed message to the target device, and determining the vulnerability of the target device from the response of the target device to the second fuzzed message, wherein the second fuzzed message has a narrower scope than the first fuzzed message.

18. The non-transitory computer-readable medium of claim 17, wherein a deviation of bits in the second fuzzed message from the data is less than a deviation of bits in the first fuzzed message from the data.

19. The non-transitory computer-readable medium of claim 17, wherein the method further comprises identifying a cause of the anomalous response from at least one of: (i) the first message; and (ii) the second message.

20. The non-transitory computer-readable medium of claim 16, further comprising sending the first fuzzed message through at least one of: (i) an in-band message set of the target device; and (ii) an out-of-band message set of the target device.

* * * * *